(12) United States Patent
Kaigala et al.

(10) Patent No.: US 10,753,954 B2
(45) Date of Patent: Aug. 25, 2020

(54) VACUUM-DRIVEN MICROFLUIDIC PROBES

(71) Applicant: International Business Machines Corporation, Armonk, NY (US)

(72) Inventors: Govind Kaigala, Rueschlikon (CH); Seyed Ali Kazemi Oskooei, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 15/646,133

(22) Filed: Jul. 11, 2017

(65) Prior Publication Data

US 2019/0018034 A1 Jan. 17, 2019

(51) Int. Cl.
*G01N 35/10* (2006.01)
*B01L 3/02* (2006.01)

(52) U.S. Cl.
CPC ............ *G01N 35/10* (2013.01); *B01L 3/0293* (2013.01); *B01L 2200/026* (2013.01); *B01L 2200/087* (2013.01); *B01L 2200/12* (2013.01); *B01L 2400/049* (2013.01); *B01L 2400/082* (2013.01); *G01N 2035/1034* (2013.01)

(58) Field of Classification Search
CPC combination set(s) only.
See application file for complete search history.

(56) References Cited

U.S. PATENT DOCUMENTS

| 6,272,939 B1 | 8/2001 | Frye et al. |
| 8,999,726 B2 | 4/2015 | Chang-Yen et al. |
| 9,075,051 B2 | 7/2015 | Tan et al. |
| 2001/0036424 A1* | 11/2001 | Takahashi ............ B82Y 30/00 422/504 |
| 2005/0120810 A1* | 6/2005 | Junger ................ B01L 3/50825 73/864 |
| 2016/0107159 A1 | 4/2016 | Gong |

OTHER PUBLICATIONS

Lovchik et al., "Vertical Microfluidic Probe Heads", 14th International Conference on Miniaturized Systems for Chemistry and Life Sciences, Oct. 3-7, 2010, Groningen, The Netherlands, pp. 1793-1795.
Natarajan et al., "Optimal Conditions for Protein Array Deposition Using Continuous Flow", Analytical Chemistry, Nov. 15, 2008, pp. 8561-8567, doi: 10.1021/ac8014609, Published on Web Oct. 22, 2008.

(Continued)

*Primary Examiner* — Xin Y Zhong
(74) *Attorney, Agent, or Firm* — Tihon Poltavets

(57) ABSTRACT

An apparatus for a vacuum-driven microfluidic probe includes a body with an apex and a processing surface, at an end of the body. The apparatus also includes a partially open cavity formed as a recess on the processing surface and a set of apertures in the cavity, where the set of apertures include a sample outlet aperture intersected by a vertical axis of the cavity. The apparatus also includes aspiration apertures radially distributed around said vertical axis, wherein the apex is further configured to generate a pressure in the cavity upon aspirating an external liquid through the aspiration apertures that causes to aspirate a liquid sample from the sample outlet aperture, so as to eject the aspirated liquid sample from the probe.

17 Claims, 12 Drawing Sheets

(56) References Cited

OTHER PUBLICATIONS

Stiles et al., "Hydrodynamic focusing for vacuum-pumped microfluidics", Microfluid Nanofluid (2005), 1: 280-283, DOI 10.1007/s10404-005-0033-z, Published on line Mar. 31, 2005, © Springer-Verlag 2005.

Xu et al., "Vacuum-driven power-free microfluidics utilizing the gas solubility or permeability of polydimethylsiloxane (PDMS)", Lab on a Chip, Royal Society of Chemistry, Sep. 2015, DOI 10.1039/c5lc00716j, 19 pages.

\* cited by examiner

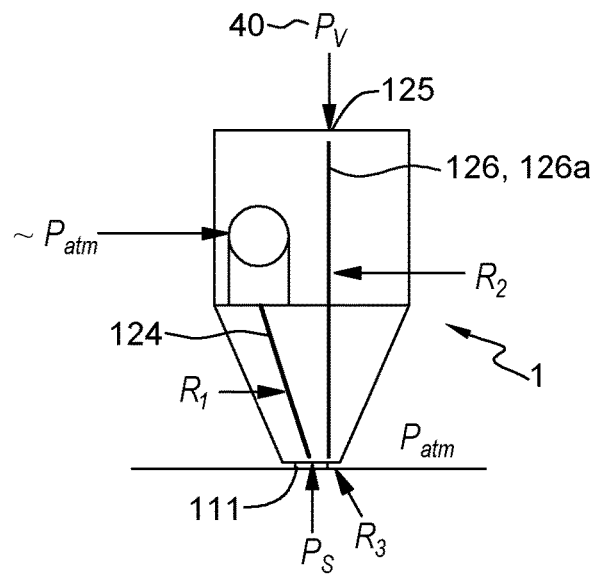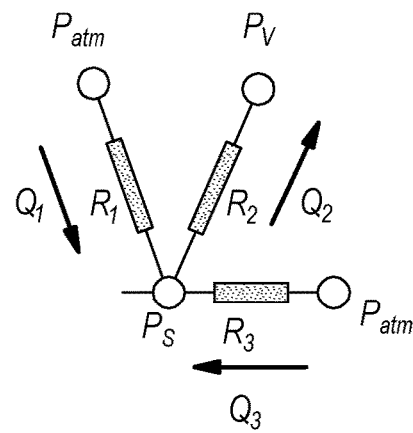
FIG. 12A          FIG. 12B
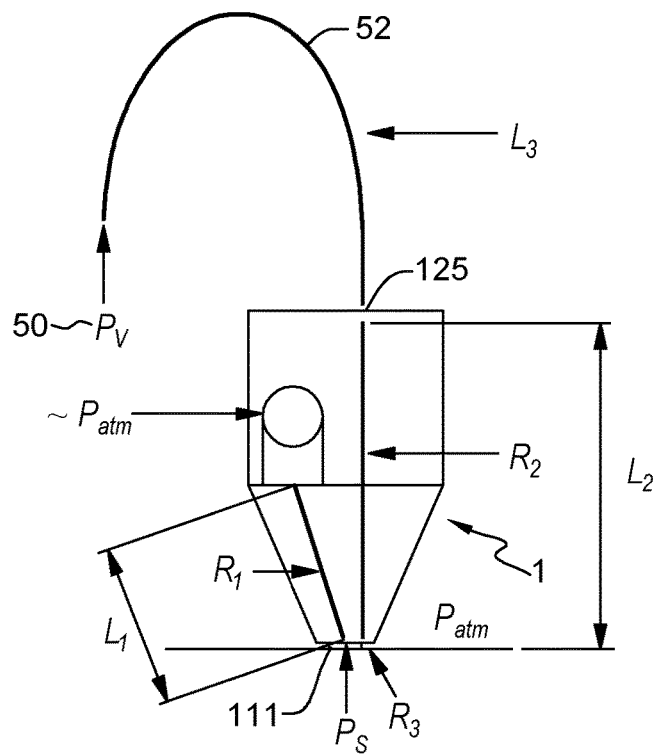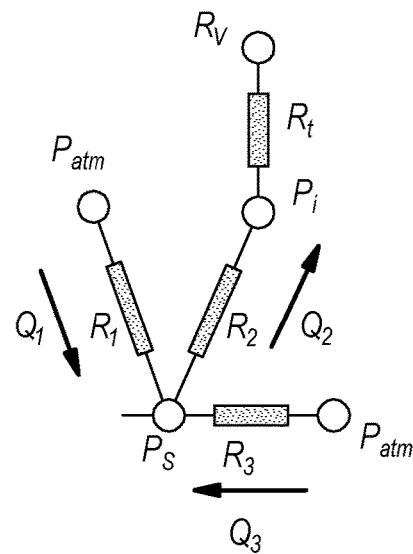
FIG. 13A          FIG. 13B

US 10,753,954 B2

VACUUM-DRIVEN MICROFLUIDIC PROBES

FIELD OF THE INVENTION

This disclosure relates generally to the field of microfluidic probes, and in particular, to vacuum-driven microfluidic probes having processing cavities, which are suitably structured and dimensioned, so as to aspirate and eject a processing liquid from the probe upon aspirating an external (e.g., immersion) liquid.

BACKGROUND

Microfluidics deals with the precise control and manipulation of small volumes of fluids that are typically constrained to micrometer-length scale channels and to volumes typically in the sub-milliliter range. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to micro-fabricated devices, which are used for pumping, sampling, mixing, analyzing and dosing liquids.

A microfluidic probe is a device for depositing, retrieving, transporting, delivering, and/or removing liquids, in particular liquids containing chemical and/or biochemical substances. For example, microfluidic probes can be used in the fields of diagnostic medicine, pathology, pharmacology and various branches of analytical chemistry. Microfluidic probes can also be used for performing molecular biology procedures for enzymatic analysis, deoxyribonucleic acid (DNA) analysis and proteomics.

Microfluidic probe (MFP) systems often require a complex fluid handling instrumentation, which may notably involve: a spatial positioning system (to control the position of the probe with respect to a surface to be processed), and various pressure sources (to control the flow rate of liquid being dispensed). For example, a quite sophisticated instrumentation is typically needed to localize (bio)chemicals on surfaces, which prevents the use of most microfluidic probe systems outside of specialized laboratories. That is, the localization of chemicals as achieved today by the MFP technology typically requires active fluidic handling (expensive) systems that are intended for use in laboratory settings and require precise positioning systems, as well as complex vacuum systems.

SUMMARY

One aspect of an embodiment of the present invention discloses an apparatus for a vacuum-driven microfluidic probe, the apparatus comprising: a body with an apex; a processing surface, at an end of the body; a partially open cavity formed as a recess on the processing surface; a set of apertures in the cavity, wherein the set of apertures include a sample outlet aperture intersected by a vertical axis of the cavity; and aspiration apertures radially distributed around said vertical axis, wherein the apex is further configured to generate a pressure in the cavity upon aspirating an external liquid through the aspiration apertures that causes to aspirate a liquid sample from the sample outlet aperture, so as to eject the aspirated liquid sample from the probe.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which:

FIG. 12A illustrates a model of pressures and hydraulic resistances, as relevant to the optimization of the design of a probe connected to a vacuum pipette (as in FIG. 11A), in accordance with an embodiment of the present invention.

FIG. 12B illustrates another model of pressures and hydraulic resistances, as relevant to the optimization of the design of a probe connected to a vacuum pipette (as in FIG. 11A), in accordance with an embodiment of the present invention.

FIG. 13A illustrates a model of pressures and resistances relevant to the optimization of the design of a probe connected to an external vacuum source (as in FIG. 11B), in accordance with an embodiment of the present invention.

FIG. 13B illustrates another model of pressures and resistances relevant to the optimization of the design of a probe connected to an external vacuum source (as in FIG. 11B), in accordance with an embodiment of the present invention.

DETAILED DESCRIPTION

Figures 1A, 1B:
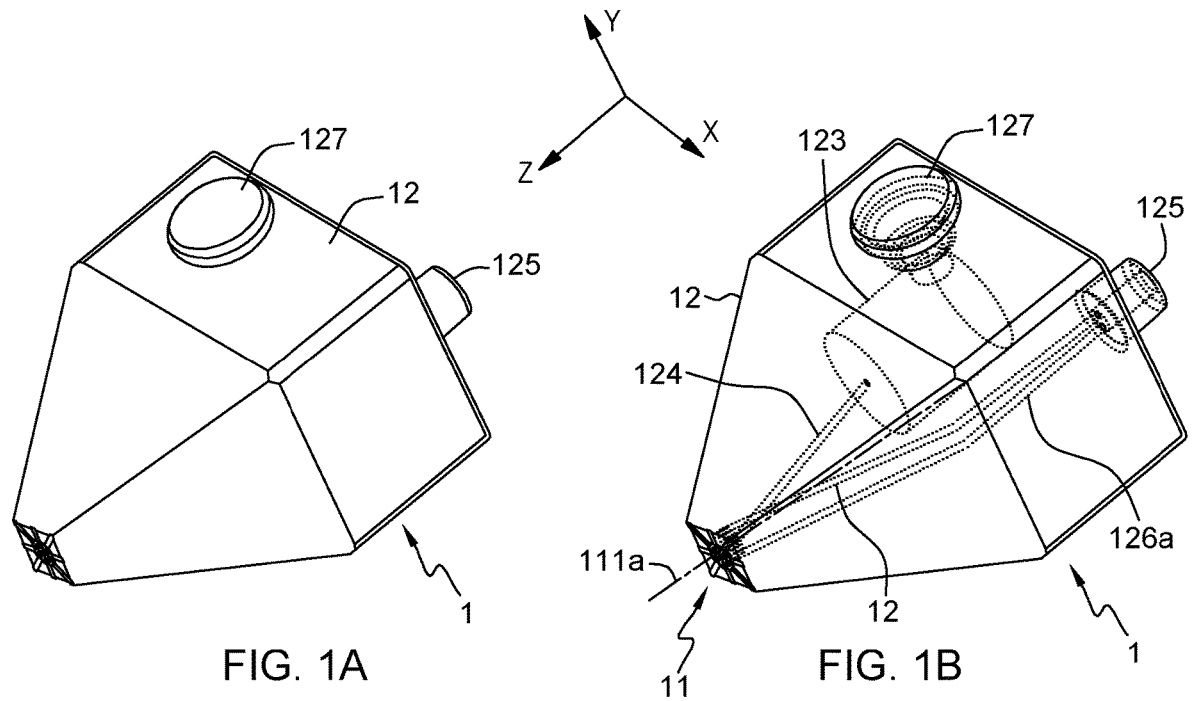
FIG. 1A illustrates a 3D view of a tapered probe, in accordance with an embodiment of the present invention.
FIG. 1B illustrates a wireframe version of the tapered probe, in accordance with an embodiment of the present invention.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

According to a first aspect, the present invention is embodied as a vacuum-driven microfluidic probe, which is typically a handheld device. The probe comprises a body with an apex, wherein the apex is structured so as to define: a processing surface, at an end of the body; a partly open cavity formed as a recess on the processing surface; and a set of apertures in the cavity. These apertures include: a sample outlet aperture, intersected by a vertical axis of the cavity; and aspiration apertures radially distributed around said vertical axis. Using such a geometrical configuration for the probe, the present Inventors have realized that it is possible to configure the apex so as to allow a pressure (or a pressure gradient) to be generated in the cavity that causes to aspirate a liquid sample from the sample outlet aperture (in the cavity) and, in turn, eject the aspirated liquid sample from the probe, upon aspirating an external liquid through the aspiration apertures, in operation.

This approach allows an autonomous or semi-autonomous probe to be achieved, which, in embodiments, may solely rely on a vacuum source to eject the processing liquid, in operation. I.e., no "positive" pressure source is strictly required, which simplifies the equipment for the probe to function. This is made possible thanks to the structured apex, wherein suitably dimensioned apertures are arranged in a partly open cavity, in which external liquid aspiration apertures are radially distributed around the sample outlet aperture.

In embodiments, the apex further comprises a liquid distribution chamber. The chamber includes: a sample inlet aperture, opposite the sample outlet aperture, so as to be intersected by the vertical axis of the cavity; and at least one vacuum conduit aperture, off-centered with respect to said axis. The apex is configured to allow opposite flow paths in the probe. A first flow path goes from the aspiration apertures to the at least one vacuum conduit aperture. A second flow path goes from the sample inlet aperture to the sample outlet aperture. Consistently with a core principle of this invention, the apex is otherwise configured to generate a pressure in the cavity that causes to aspirate liquid sample along the second flow path, upon aspirating external liquid along the first flow path.

The above concept of liquid distribution chamber allows opposite flows to be managed in a typically small volume, in the apex and above the cavity. Having centered sample inlet and outlet apertures, while aspiration apertures and vacuum conduit apertures are off-centered with respect to the cavity axis conceptually simplifies the liquid distribution and further makes it possible to maintain coherent streams, within and above the cavity, which, in turn, helps in achieving the desired pressure (gradient) in the cavity.

Preferably, the body further includes a conduit network comprising a sample feed conduit and at least one vacuum conduit and. Each vacuum conduit leads to a respective vacuum conduit aperture. I.e., the first flow path goes from the aspiration apertures to each vacuum conduit, via a respective vacuum conduit aperture. The sample feed conduit leads to the sample inlet aperture, whereby the second flow path goes from the sample feed conduit to the sample outlet aperture, via the sample inlet aperture.

The above configuration makes it possible to achieve a hydrodynamic conduit network directly in the probe, which network may specifically be designed to deliver a desired flow rate of reagents. This, in turn, allows a more autonomous probe to be achieved, which allows flow-control, even without a positive pressure source. In embodiments, the conduit network may even be designed so as to impose a constant ratio between the flow rates of the aspirated and ejected liquids and, in turn, achieve a hydrodynamic flow confinement of the ejected liquid.

In preferred embodiments, the apex further comprises legs that are radially distributed with respect to said vertical axis, so as to form aspiration slots defined, each, between contiguous ones of the legs. The aspiration slots are in fluid communication with said aspiration apertures.

Using legs as defined above has numerous advantages as the legs may fulfil different functions. First, they allow aspiration slots to be defined, such that external liquid can be aspirated radially and/or vertically, notwithstanding the arrangement of the aspiration apertures in the cavity, since the aspiration slots are in fluid communication with such apertures. In addition, the legs may provide landing pads, which determine the minimal touch-down distance, when operating the probe. Thus, legs may ease a touch-down operation of the probe.

Preferably, the legs extend in a plane perpendicular to said vertical axis and opposite to the sample outlet aperture, so as to partly close the cavity. A rim of the cavity is further defined by innermost edges of the legs.

That is, legs can be formed that extend opposite the recessed surface of the cavity so as to partly close the latter. Still, the cavity need be partly open to the surface to be processed. Thus, the residual opening of the cavity can advantageously be formed by inner edges of the legs, which accordingly define a rim of the cavity. The legs hence define a constant cavity volume, in which external liquid gets aspirated, while liquid sample is being ejected, which helps in maintaining a substantially constant pressure (or pressure gradient) in the cavity, in operation.

In embodiments, the apex is further configured so as to allow liquid aspirated from the sample inlet aperture to be confined, in the cavity, within external liquid aspirated through the aspiration slots, in operation. For example, by correctly dimensioning the legs (for them to define a sufficiently small rim of the cavity), the aspiration slots in-between and the outlet aperture, one may further achieve two fairly well-separated flow paths, even in the cavity, with the ejected (processing) liquid being confined within the aspirated (external) liquid. This way, analyte localization can be achieved, when processing a surface, without resorting to a complex instrumentation. Even, with a suitably designed hydraulic conduit network, a hydrodynamic flow confinement of the ejected liquid can be obtained, as noted above.

Preferably, the liquid distribution chamber of the apex further comprises distribution channels that extend parallel to the vertical axis of the cavity. The distribution channels are radially distributed with respect to the cavity axis and in fluid communication with said aspiration apertures. Thus, the first flow path goes from the aspiration apertures to the vacuum conduit aperture(s) via the distribution channels. The distribution channels help in distributing the aspirated (external) liquid up to the vacuum aperture(s), while the apertures at the end of the distribution channels (at the level of the cavity) define regions in which opposite flows can be made concentric. This makes it possible to eject the liquid sample in a coherent stream into the surrounding medium, while coherent streams of external liquid are aspirated through the vertical channels and guided up to the vacuum conduit apertures. This, altogether, helps in maintaining a constant pressure (or pressure gradient) in the cavity.

To further ease the liquid distribution, the liquid distribution chamber preferably comprises at least one junction cavity. This junction cavity is configured so as to ensure fluid communication between, on the one hand, a subset (at least) of the distribution channels and, on the other hand, a respective vacuum conduit aperture.

Preferably, the body of the microfluidic probe further comprises a sample reservoir, integrated in the body. The sample feed conduit is arranged so as to fluidically connect the sample reservoir to the liquid distribution chamber, within the probe. I.e., an onboard reagent reservoir is thus provided directly within the body of the probe, which makes the device more autonomous. The body of the probe may for instance comprise a reservoir inlet provided on a top face of the body, opposite to said processing surface of the probe or on a lateral face of the body, parallel to the vertical axis of the cavity.

In addition, the body may be equipped with a vacuum port, designed so as to allow a vacuum source to be removable and connected to the body. The vacuum port is connected to the liquid distribution chamber via the vacuum conduit(s).

Preferably, the sample feed conduit is configured, in the body, so as to exhibit one or more pairs of hairpin turns. For example, an s-channel configuration is obtained, which is useful for leakage prevention, especially when relying on an upright reservoir design.

In preferred embodiments, the probe further comprises a vacuum pipette connectable to a vacuum port of the body, so as to provide a vacuum source for operating the probe. No complex vacuum source is needed in that case. No positive pressure sources need be involved either. Rather, a mere pipette suffices to operate the probe. Thus, a fully autonomous system can be obtained; assuming the body otherwise includes a reservoir, integrated therein.

In typical embodiments, the average diameter of the sample outlet aperture is between 50 µm and 1 mm. Yet, it is preferably in the sub-millimeter range. A characteristic dimension of the total footprint of the probe (at the level of its processing surface) is typically 10 times that of the outlet aperture. This ratio, however, is flexible and the optimal ratio depends on the desired application and flow rates. The footprint and aperture dimensions impact, in turn, the number of aspiration apertures needed in practice. In that respect, the apex is preferably structured so as to define between four and twelve aspiration apertures.

Preferably, the body of the probe comprises two vacuum conduits leading to respective vacuum conduit apertures in the liquid distribution chamber, so as to ease the collection of external liquid, in operation.

In preferred embodiments, the body of the probe further comprises one or more screw side valves, the valves configured to modify a flow rate of liquid flow in one or each of the sample feed conduit and the vacuum conduit. This way, simple additional flow control can be offered to a user, without impacting the autonomy of the probe.

According to another aspect, the invention is embodied as a method of operating a vacuum-driven microfluidic probe such as described above. The method comprises connecting a vacuum source to the probe and immersing the apex of the probe in an external liquid covering a surface to be processed. Connecting the vacuum source causes to aspirate the external liquid, in which the probe is immersed, through the aspiration apertures in the cavity. In turn, this aspiration generates a pressure in the cavity, as per the design of the apex, which pressure causes to aspirate liquid sample from the sample outlet aperture and eject the aspirated liquid sample toward the surface to be processed.

Preferably, the body of the probe comprises a vacuum port adapted for removable connecting a vacuum pipette, which vacuum port is connected to the cavity. Thus, present methods may further comprise connecting such a pipette to the vacuum port.

As noted above, the body of the probe preferably comprises a reservoir, integrated in the body so as to be in fluid communication with the sample outlet aperture, as well as a removable reservoir cap, which is adapted to close an inlet of the reservoir on the body. Then, a preferred order of steps is as follows. First, the reservoir is loaded with a liquid sample. Second, the reservoir is capped by closing the reservoir inlet with the cap, prior to connecting the vacuum source to the probe. Finally, after having connected the vacuum source and immersed the apex of the probe in an external liquid, the reservoir cap is removed, to allow liquid sample to be drawn from the reservoir.

Microfluidic probe, probe systems and methods of operation thereof that embody the present invention will now be described, by way of non-limiting examples, and in reference to the accompanying drawings.

In reference to FIGS. 1-9, an aspect of the invention is first described, which concerns vacuum-driven microfluidic probes 1, 1a, 2, 2a. Various embodiments of such probes are depicted in the accompanying drawings, which include tapered probes, conic probes and variants thereto.

In all cases, the present microfluidic probes (MFPs) comprise, each, a main body 12, 22, which is preferably configured so as to be handled by a user, to ease operation of the probe. The body may notably have a tapered shape, as in FIGS. 1-4, or a conic shape. Thus, the body 12, 22 may exhibit some rotational symmetry about a vertical axis z. However, this is only optional, as the precise geometry of the body will depend on the application sought and the desired ergonomics of the probe. Thus, more ergonomic variants can be contemplated. In that respect, the body 12, 22 of the probe may be shaped as a handle, or a handgrip, designed to allow the user a more comfortable or more secure hold on the probe.

FIG. 1A illustrates a 3D view of a tapered probe, in accordance with an embodiment of the present invention. FIG. 1B illustrates a wireframe version of the tapered probe, in accordance with an embodiment of the present invention.

In all cases, the body 12, 22 comprise a processing apex 11, 21, i.e., a processing tip, meant to come in contact or in close proximity with a surface to be processed. This apex is accordingly structured so as to define a processing surface 112, 212, at an end of the body 12, 22. In typical embodiments, the apex 11 evokes a nozzle. However, contrary to a usual nozzle, the apex is here structured so as to guide opposite liquid flows.

In more detail, the apex is structured so as to define a partly open cavity 111, 211. The latter is formed as a recess on the processing surface 112, 212. That is, a main face of the cavity is recessed with respect to a lower processing plane 112, 212 of the apex (assuming a vertical orientation as in FIG. 3D, 6B, 12A or 13A).

A set of apertures is formed in the cavity, which apertures include a sample outlet aperture 117, 217 and aspiration apertures 116, 216, where inlet 115 leads to aperture 117. The sample outlet aperture 117, 217 is intersected by a vertical axis 111a, 211a of the cavity 111, 211, whereas the aspiration apertures 116, 216 are radially distributed around said vertical axis 111a, 211a. This axis is transverse to (e.g., perpendicular to the area spanned by) the sample outlet aperture 117, 217. The main direction of extension of the body typically extends along the vertical axis 111a, 211a.

The apex 11, 21 is further configured to generate a pressure (or a pressure gradient) in the cavity 111, 211 that causes to aspirate a liquid sample from the sample outlet aperture 117, 217, so as to eject the aspirated liquid sample from the probe and, thus, upon aspirating an external liquid $L_e$ through the aspiration apertures 116, 216.

That the aspiration apertures 116, 216 are "radially distributed" around the vertical axis 111a, 211a means that these apertures 116, 216 are distributed about the axis 111a, 211a of the cavity, at a distance therefrom. They may for instance be all at a same or substantially the same distance from the cavity axis 111a, 211a. In that case, the aspiration apertures 116, 216 are arranged along a ring about the axis 111a, 211a. This axis is assumed to be parallel to axis z in the accompanying drawings and sometimes referred to as a "vertical" axis in the following.

However, the aspiration apertures 116, 216 need not be all exactly at the very same distance from the axis 111a, 211a. They are furthermore not necessarily all arranged in a same plane transversely to the vertical axis 111a, 211a either, although they preferably are, are it to ease the fabrication process of the cavity. I.e., the cavity is preferably designed so as to exhibit a main surface (on which these apertures are defined) that forms a flat face, recessed with respect to the processing plane 112, 212, subtended by the peripheral rim 113r, 213r of the cavity. The rim is formed by a lateral surface (or surface portions), extending parallel to the cavity axis and terminated by an edge (or edges) that separate the inner cavity from the outer processing surface 112, 212.

Thus, the aspiration apertures 116, 216 may be distributed on a ring, at a constant polar radius from the vertical axis 111a, 211a and may possibly exhibit some rotational symmetry about the vertical longitudinal axis 111a, 211a.

The aspiration apertures 116, 216 define vertical openings (adopting again the same orientation as in, e.g., FIG. 3D), in the sense they allow fluid to be aspirated vertically (i.e., parallel to axis z) in the cavity along directional axes parallel to the vertical axis 111a, 211a of the cavity. As we shall see, the aspiration apertures 116, 216 may nevertheless be in fluid communication with radial openings 114, 214, whose directional axes are transverse to the vertical axis 111a, 211a of the cavity 111, 211, to ease lateral aspiration of external liquid. The radial opening shall preferably be formed as slots in that case, which slots can further be open from below and, thus, allow external liquid $L_e$, in which the apex 11, 21 of the probe is immersed, to be aspirated both radially and vertically, as assumed in the accompanying drawings.

The above design allows an autonomous or semi-autonomous probe to be achieved, which may solely rely on a vacuum source 40, 50 to eject processing liquid, in operation. I.e., no "positive" pressure source is required, only a "negative" (vacuum) pressure source is needed, which simplifies the equipment for the probe to function. As present Inventors have realized, this is made possible thanks to a structured apex 11, 21, which, as described above, comprises suitably dimensioned and located apertures in a partly open cavity 111, 211, wherein external liquid aspiration apertures 116, 216 are radially distributed around the sample outlet aperture.

For this to work the sample outlet aperture 117, 217 need be centered in the recessed surface of the cavity 111, 211 and the aspiration apertures 116, 216 need be radially distributed around the sample outlet aperture, within the cavity. This way, the pressure generated in the recessed cavity when aspirating the external liquid $L_e$ through the aspiration apertures spontaneously causes liquid sample to be drawn from the outlet aperture 117, 217. Thus, the liquid sample (reagent etc.) can be ejected toward a surface S to be processed, just by aspirating external liquid.

Taking advantages of the present apex designs, embodiments described herein notably make it possible to get rid of sophisticated bulky flow control systems and power sources. Instead, at least some of the embodiments described below provide adequate technology for point-of-use devices, with minimum (or zero) instrumentation, which are simple to operate and user-friendly. Semi-autonomous device is notably proposed, which do not need any positive pressure source. Such devices may nevertheless still require to be connected to an external vacuum source. Additional autonomy can be gained by integrating one or more reservoirs 123, 223 in the body 12, 22 of the probe. Moreover, fully autonomous devices may be achieved thanks to one or more reservoirs and dedicated vacuum ports integrated in the body of the probe, allowing the probe to use a mere syringe as vacuum source, directly connected to the body of the probe.

The present MFP devices do not necessarily require expensive or tedious micro-fabrication techniques. Indeed, MFPs as described herein can be essentially fabricated through 3D printing techniques, without requiring sophisticated cleanroom facilities. The probe is thus preferably made of a polymer, such as thermoplastic polymers (e.g., thermoplastic aliphatic polyester, acrylonitrile butadiene styrene).

Referring now more particularly to FIGS. 3B-3D and 7B, preferred embodiments of the present MFPs involve an apex 11, 21 that comprises a liquid distribution chamber 14, 24. This chamber includes a sample inlet aperture 147, 247, opposite the sample outlet aperture 117, 217, such as to be intersected by the vertical axis 111a, 211a of the cavity 111, 211. I.e., the axis 111a, 211a of the cavity 111, 211 passes through each of the inlet aperture 147, 247 and the outlet aperture 117, 217. The liquid distribution chamber 14, 24 further includes one or more (likely two) vacuum conduit apertures 148, 148a, 248, 248a, located on top of the chamber in the accompanying drawings, and off-centered with respect to the cavity axis 111a, 211a.

Thus, the apex 11, 21 is configured so as to define two flow paths. A first flow path goes from the aspiration apertures 116, 216 to the vacuum conduit aperture(s) 148, 148a, 248, 248a, while the second flow path goes from the sample inlet aperture 147, 247 to the sample outlet aperture 117, 217. Consistently with the principles underlying the present invention, the apex 11, 21 is configured to generate a pressure in the cavity 111, 211 that causes to aspirate liquid sample along the second flow path, upon aspirating external liquid $L_e$ along the first flow path.

In other words, the sample feed aperture 147, 247 and the outlet aperture 117, 217 are centered on opposite sides of the chamber 12, 24. The vertical axis 111a, 211a of the cavity, while the aspiration apertures 116, 216 and the vacuum aperture(s) are off-centered with respect to this axis join these apertures. The upper apertures 147, 247, 148, 148a, 248, 248a are typically joined by respective conduits on top of the chamber, as described below in detail.

The above concept of liquid distribution chamber allows opposite flows to be managed in a typically small volume, in the apex and above the cavity. Having aligned sample inlet and outlet apertures, while aspiration apertures and vacuum conduit apertures are off-centered with respect to the cavity axis, conceptually simplifies the liquid distribution and further makes it possible to maintain coherent streams, within and above the cavity, which, in turn, helps in achieving the desired pressure (gradient) in the cavity.

Referring now more particularly to FIGS. 1B-2B, and 5B-6B, the body 12, 22 of the MFP preferably includes a hydrodynamic conduit network. Indeed, and as present inventors have further realized, one may integrate a conduit network directly in the probe, which network may be specifically designed to deliver a desired flow rate of reagents, as explained in more detail in sect. 2. Optimizing the conduit network allows a more autonomous probe, with minimal or no external flow control needed, since the conduit network (notwithstanding the lack of positive pressure source) ensures the liquid flow regulation.

This network comprises one or more (likely two) vacuum conduits 126, 126a, 226, 226a, each leading to a respective vacuum conduit aperture 148, 148a, 248, 248a. Accordingly, the first flow path goes from the aspiration apertures 116, 216 to the vacuum conduit(s) 126, 126a, 226, 226a, via the vacuum conduit aperture(s) 148, 148a, 248, 248a. This conduit network further comprises a sample feed conduit 124, 224, leading to the sample inlet aperture 147, 247. Accordingly, the second flow path goes from the sample feed conduit 124, 224 to the sample outlet aperture 117, 217, via the sample inlet aperture 147, 247.

The sample inlet aperture 147, 247 is preferably arranged at the center of a dome of the chamber 14, 24, i.e., at the center of the roof of the chamber. Since more than one vacuum apertures can be used, several vacuum conduits 126, 126a, 226, 226a may be involved. Preferably though, two vacuum apertures are relied on, which are symmetrically arranged with respect to the sample inlet aperture (and so the vertical axis of the cavity), so as to ensure symmetric aspiration around the ejected stream, as assumed in the accompanying drawings. This allows more coherent streams of aspirated liquid to occur in the chamber.

Normally, each vacuum conduit leads to a respective vacuum aperture, as assumed in the accompanying drawings. Yet, more sophisticated vacuum circuits may be contemplated, which involve junctions above the chamber, such that one vacuum conduit may possibly split and lead to several vacuum conduit apertures.

Flow control can be achieved thanks to specific dimensions of the various conduits, as latter discussed in more detail in sect. 2. Even, the conduit network can be designed so as to impose a constant ratio between the flow rates of the aspirated and ejected liquids, thereby favoring confinement of the ejected liquid.

Figures 2A, 2B:
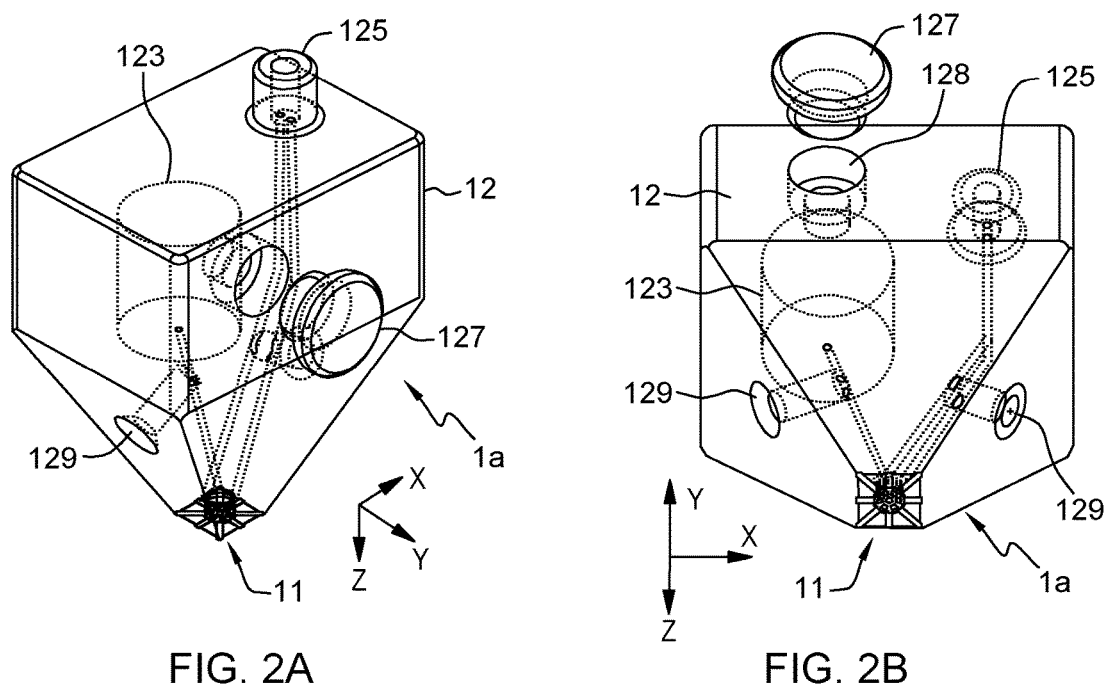
FIG. 2A illustrates a first wireframe view of the tapered probe in FIG. 1A, which further includes screw side valves, in accordance with an embodiment of the present invention.
FIG. 2B illustrates a second wireframe view of the tapered probe in FIG. 1A, which further includes screw side valves, in accordance with an embodiment of the present invention.

FIG. 2A illustrates a first wireframe view of the tapered probe in FIG. 1A, which further includes screw side valves, in accordance with an embodiment of the present invention. FIG. 2B illustrates a second wireframe view of the tapered probe in FIG. 1A, which further includes screw side valves, in accordance with an embodiment of the present invention.

In embodiments (see FIGS. 2A, 2B), one or more screw side valves 129 may be provided on the body 12 of the probe 1a. The valves are designed so as to allow a flow rate of liquid flow to be modified in the sample feed conduit 124 and/or the vacuum conduit(s) 16, 16a. Such valves are typically arranged in the vicinity of the sample feed conduit 124 and/or on the vacuum conduit 126, 126a. Typically, a deformable end of a screw cylinder reaches into a respective conduit 124, 126, 126a. A screw head, a small hand wheel or lever is externally accessible for a user to actuate it and convert rotational movement of the head into a linear movement of the screw cylinder. This allows the user to easily modify the hydraulic resistance of and the liquid flow rate in that conduit. Only one valve may be provided to modify the flow rate of liquid on either path. As one understands, modifying the sole aspiration flow rate, however, would likely impact the pressure generated in the cavity and, therefore, impact the flow rate of ejected liquid too. More than one valve may be provided, to allow finer control. Beyond screw valves, other types of local valves can be contemplated. Still, such valves are optional, in as much as the hydrodynamic conduit network may already be designed so as ensure adequate flow control.

Figure 3A:
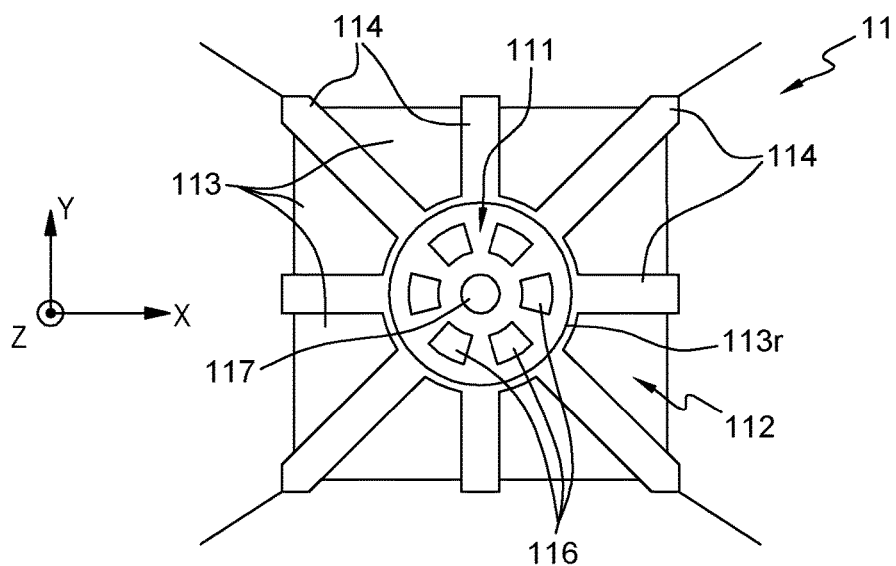
FIG. 3A illustrates a front view of the structured apex of the tapered probe in FIG. 1A, in accordance with an embodiment of the present invention.
Figure 3B:
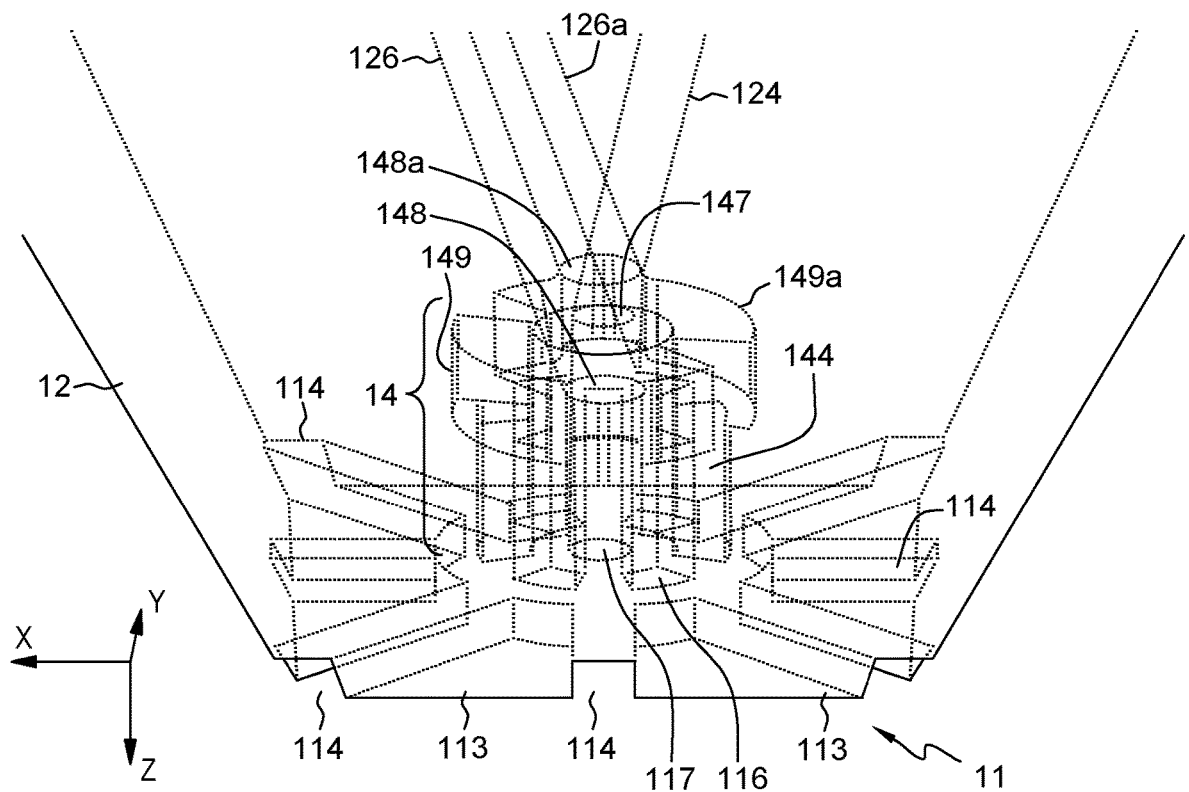
FIG. 3B illustrates a 3D wireframe view focusing on the structured apex of the tapered probe in FIG. 1A, in accordance with an embodiment of the present invention.
Figure 3C:
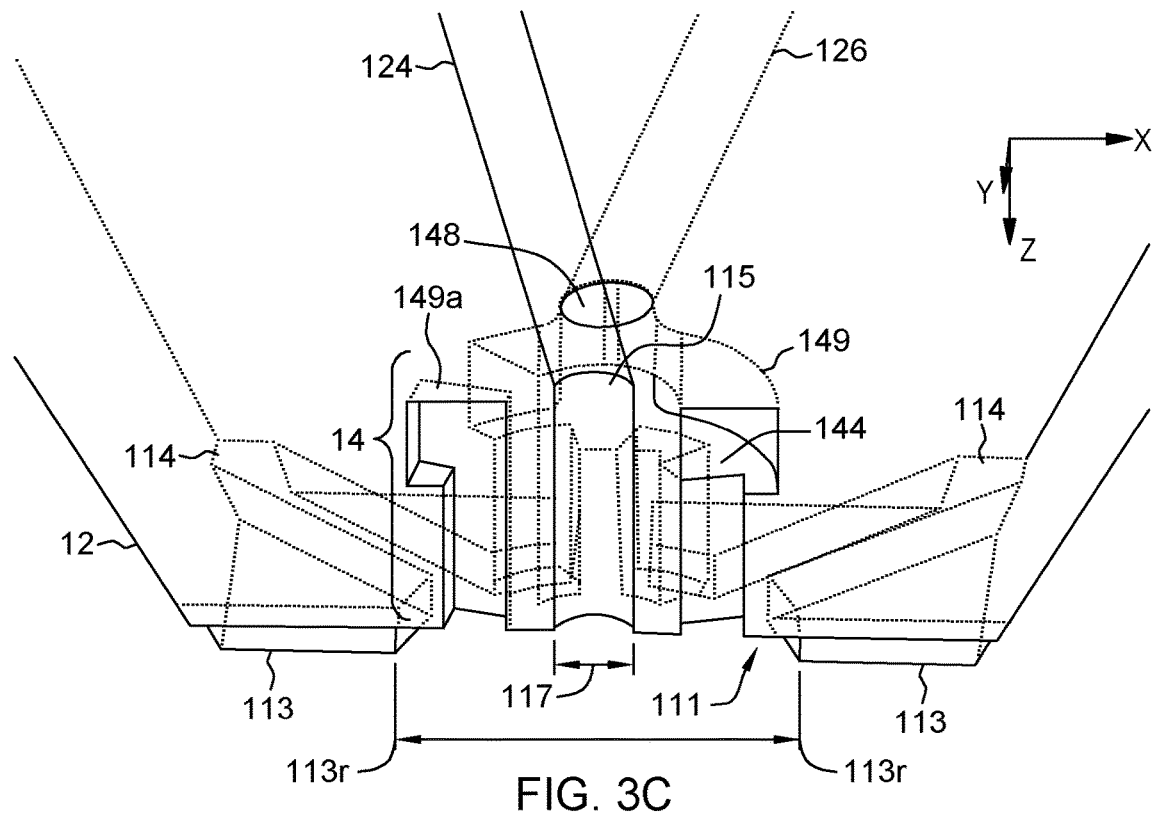
FIG. 3C illustrates another 3D wireframe view of the structured apex of the tapered probe in FIG. 1A, in accordance with an embodiment of the present invention.
Figure 3D:
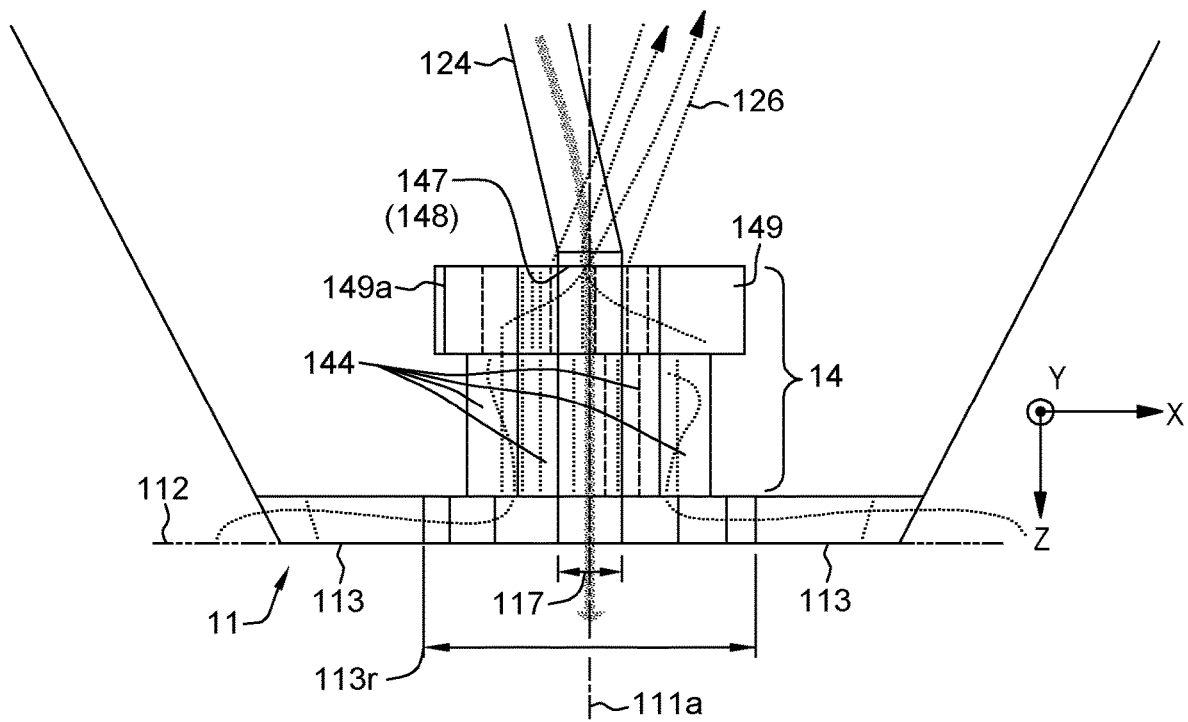
FIG. 3D illustrates a cross-section view of the structured apex of the tapered probe in FIG. 1A, accordance with an embodiment of the present invention.

FIG. 3A illustrates a front view of the structured apex of the tapered probe in FIG. 1A, in accordance with an embodiment of the present invention. FIG. 3B illustrates a 3D wireframe view focusing on the structured apex of the tapered probe in FIG. 1A, in accordance with an embodiment of the present invention. FIG. 3C illustrates another 3D wireframe view of the structured apex of the tapered probe in FIG. 1A, in accordance with an embodiment of the present invention. FIG. 3D illustrates a cross-section view of the structured apex of the tapered probe in FIG. 1A, accordance with an embodiment of the present invention.

Figure 5A:
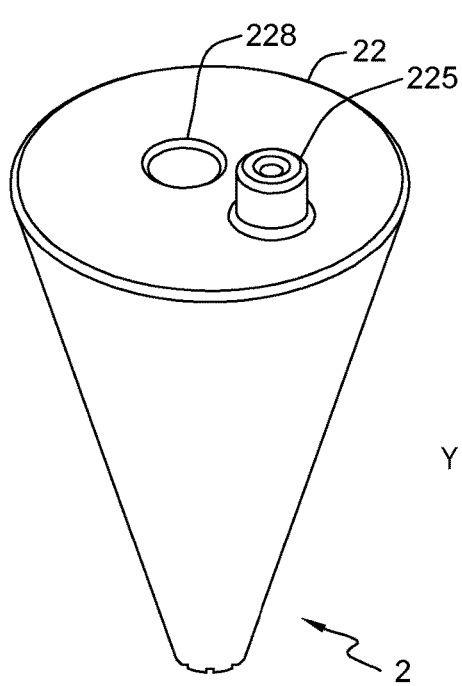
FIG. 5A illustrates a 3D view of the tapered probe in FIG. 1A, in accordance with an embodiment of the present invention.
Figure 7A:
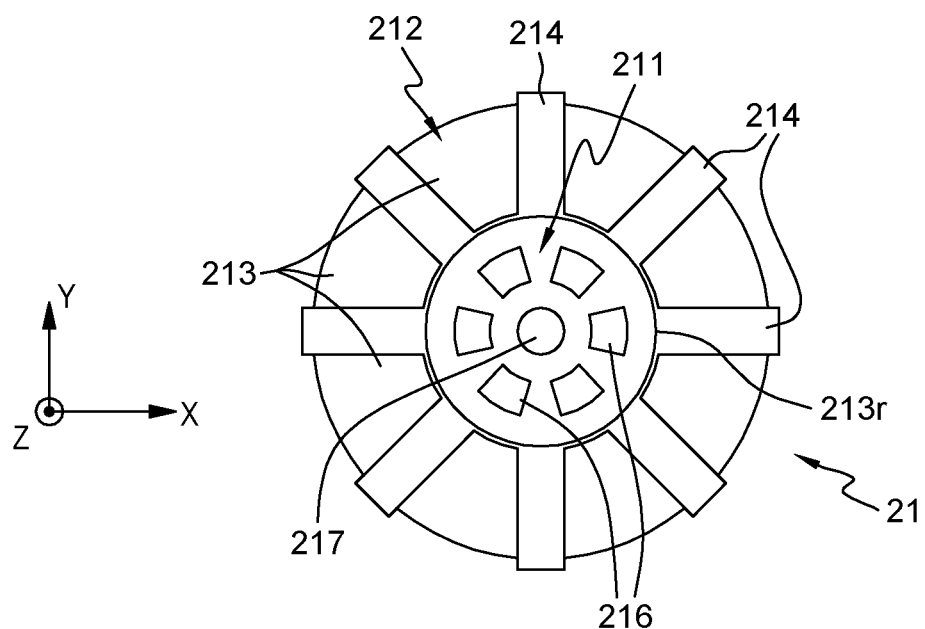
FIG. 7A illustrates a front view of the structured apex of the tapered probe in FIG. 5A, in accordance with an embodiment of the present invention.
Figure 7B:
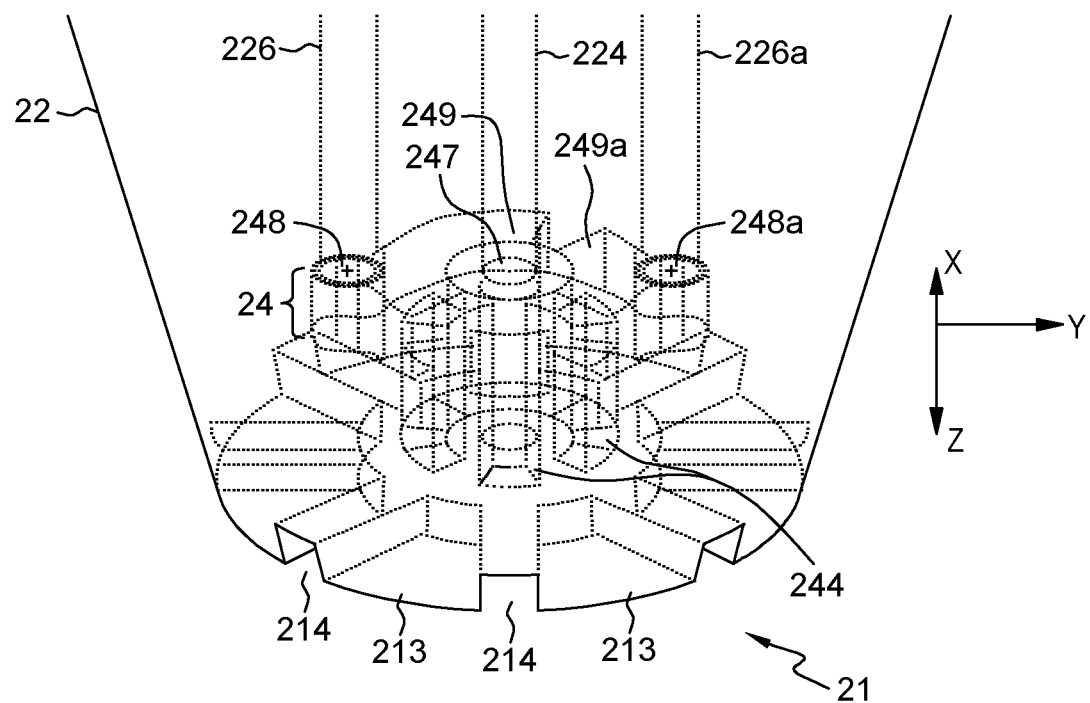
FIG. 7B illustrates a 3D wireframe view focusing on the structured apex and the liquid distribution chamber of such a conic probe, in accordance with an embodiment of the present invention.

FIG. 7A illustrates a front view of the structured apex of the tapered probe in FIG. 5A, in accordance with an embodiment of the present invention. FIG. 7B illustrates a 3D wireframe view focusing on the structured apex and the liquid distribution chamber of such a conic probe, in accordance with an embodiment of the present invention.

Preferred embodiments are now described in reference to FIGS. 3A-3D, and 7A-7B, in which the apex 11, 21 of the MFP 1, 1a, 2, 2a further comprises legs 113, 213, i.e., protrusions which may form flanges, lugs, posts or pillars, and which are radially distributed with respect to the cavity axis 111a, 211a. These legs form aspiration slots 114, 214. That is, each aspiration slot 114, 214 is defined between contiguous ones of the legs 113, 213. The aspiration slots may define radial and/or in-plane openings, as explained below. The slots 114, 214 are otherwise in fluid communication with the aspiration apertures 116, 216. In this description, "in fluid communication with" or "fluidically connected to" refers to one and a same concept, whereby a fluid (i.e., a liquid) is allowed to pass from one of the part to the other, through a passage, a channel, or any other suitably designed connection.

Using legs 113, 213 as described above has numerous advantages as legs 113, 213 may fulfill different functions. First, they allows aspiration slots 114, 214 to be defined in-between, whereby the external liquid $L_e$ can be aspirated radially and/or vertically, before reaching the aspiration apertures 116, 216. That is, the aspiration slots 114, 214 may define radial openings only (so as to enable radial aspiration, perpendicular to the cavity axis), in-plane openings only (to enable vertical aspiration), or still both radial and in-plane openings, as assumed in the appended drawings. Second, the legs may provide adequate landing pads, which determine the minimal touchdown distance, when operating the probe in contact mode. To that aim, the legs may be slightly deformable, elastically. Thus, legs 113, 213 may ease a touchdown operation of the probe. Yet, non-contact operation of the probe can be contemplated, as described later in reference to FIGS. 8 and 9.

As depicted in the accompanying drawings, the legs 113, 213 preferably extend in a plane perpendicular to the cavity axis 111a, 211a, i.e., opposite to the sample outlet aperture 117, 217, so as to partly close the cavity 111, 211. In addition, the rim 113r of the cavity may be defined by innermost edges of the legs 113, 213. For example, centripetal legs 113, 213 may be formed, which are opposite the recessed surface of the cavity, so as to partly close the latter. The cavity is nevertheless partly open to the surface to be processed, thanks to the processing aperture as defined by the rim 113r, 213r of the cavity, which rim is defined by inner edges the legs. Thus, the legs partly close the cavity, thereby defining a constant volume in which external liquid gets aspirated, while liquid sample is being ejected, which allows a substantially constant pressure (or pressure gradient) to be maintained, in operation. That is, when the apex comes in contact with the surface, it forms an enclosed circular cavity, wherein the reagent comes into contact with the surface before it is collected by the vacuum line.

Thus, in this embodiment, an additional function of the legs 113, 213 is to determine the height of the cavity. The leg height indeed impacts the geometry of the cavity and hence the ratio of flow rates of opposite flows occurring therein. The leg height can thus be tuned, like many other parameters, to adapt the flow control. In addition, and as explained above, the legs allow immersion liquid $L_e$ to be aspirated through the slots defined in-between and further define a minimal approach distance, i.e., the minimal working distance between the processed surface and the probe.

Figure 3E:
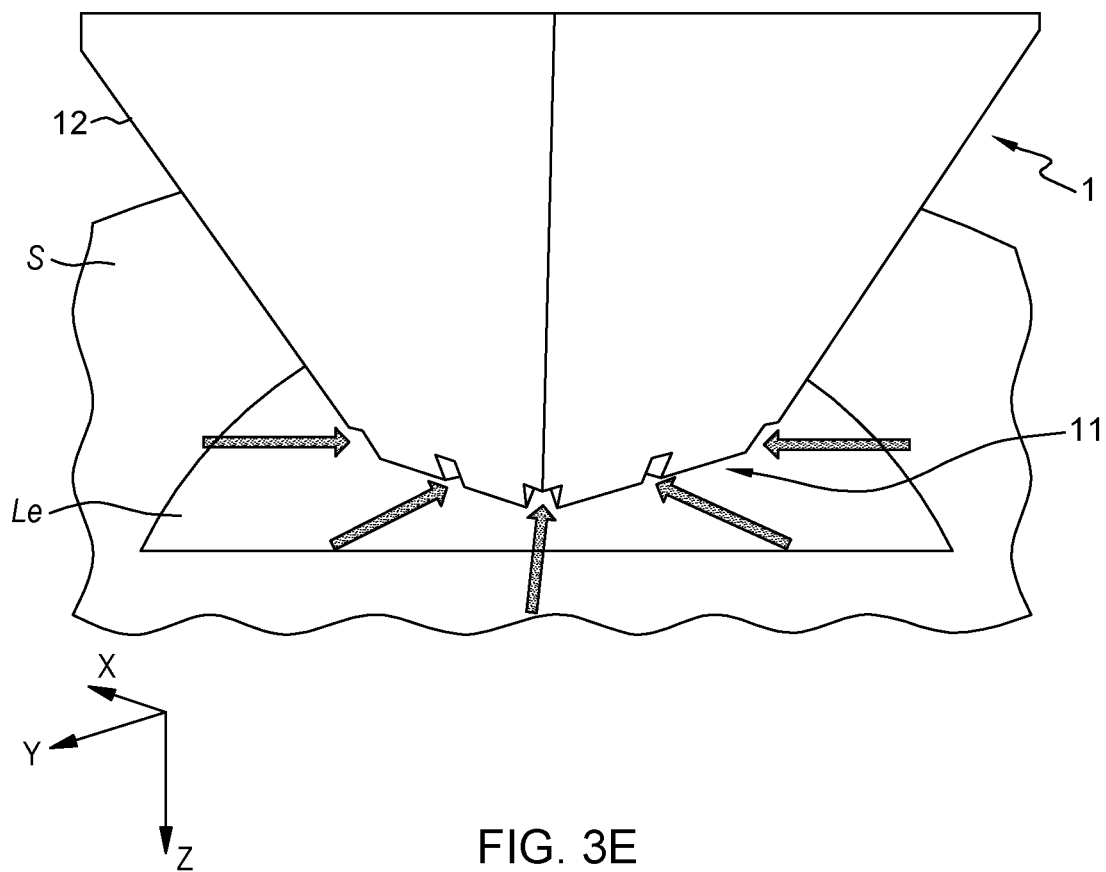
FIG. 3E illustrates another 3D view of the structured apex of the tapered probe in FIG. 1A, in accordance with an embodiment of the present invention.
Figure 3F:
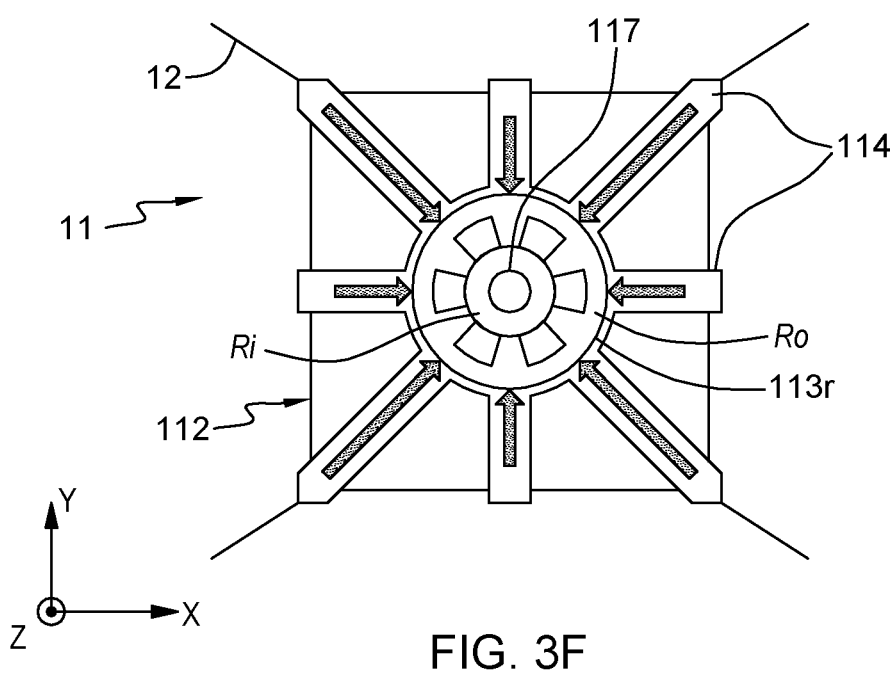
FIG. 3F illustrates an overhead view of the structured apex of the tapered probe in FIG. 1A, in accordance with an embodiment of the present invention.

FIG. 3E illustrates another 3D view of the structured apex of the tapered probe in FIG. 1A, in accordance with an embodiment of the present invention. FIG. 3F illustrates an overhead view of the structured apex of the tapered probe in FIG. 1A, in accordance with an embodiment of the present invention.

Referring now more specifically to FIG. 3D-3F, the apex 11, 21 is preferably configured so as to allow liquid aspirated from the sample inlet aperture 147, 247 to be confined, in the cavity 111, 211, within the external liquid $L_e$, while the latter is being aspirated through the aspiration slots 114, 214, in operation. Indeed, and as present Inventors have further realized, by correctly dimensioning: (i) the legs 113, 213 for them to define a sufficiently small rim of the cavity; and (ii) the aspiration slots 114, 214 in-between and the sample outlet aperture 117, 217, one may further achieve two fairly well-separated flow paths, whereby the ejected processing liquid is confined within the aspirated external liquid at the level of the cavity. This way, localization can be achieved, when processing a surface S. Even, with a suitably designed hydraulic conduit network, a hydrodynamic flow confinement (or HFC) of the ejected liquid can be obtained, hence allowing clean patterns of deposited chemicals, in embodiments.

As seen in FIGS. 3B-3E, and 7B, the liquid distribution chamber 14, 24 of the apex 11, 21 preferably comprises vertical distribution channels 144, 244. The distribution channels 144, 244 extend parallel to the vertical axis 111a, 211a of the cavity and radially distributed with respect to the cavity axis 111a, 211a, in the same way the apertures 116, 216 are. The distribution channels 144, 244 are in fluid communication with these aspiration apertures 116, 216. Preferably, the latter precisely correspond to the lower apertures of the distribution channels 144, 244 (each channel 144, 244 leads to exactly one aperture 116, 216 in that case). In more sophisticated variants, junctions could be provided between apertures 116, 216 and vertical channels 144, 244, in which case the number of vertical distribution channels 144, 244 may differ from the number of aspiration apertures 116, 216 in the cavity. In all cases here, the first flow path can be defined as going from the aspiration apertures 116, 216 to the vacuum conduit aperture(s) 148, 148a, 248, 248a, via the distribution channels 144, 244.

The distribution channels 144, 244 ease the collection of aspirated (external) liquid from the cavity, which is brought to the vacuum aperture(s), in operation. The distribution channels 144, 244 further lead to aspiration apertures 116, 216 that define regions $R_i$, $R_o$, at the level of the cavity in which the opposite flows are concentric. This makes it possible to eject the liquid sample in a coherent stream into the surrounding medium, while coherent streams of external liquid are aspirated through the vertical channels 144, 244, through the cavity and above the latter. This, altogether, helps in maintaining a constant pressure or pressure gradient in the cavity.

In more detail, and as depicted in FIG. 3F, the vertical distributions channels 144, 244 and their end aspiration apertures 116, 216 define two concentric regions $R_i$, $R_o$ in the recess of the cavity 111, 211, which regions are delimited by apertures 116, 216. The two regions include an inner region $R_i$ and an outer region $R_o$, such that, in the cavity 111, 211, the liquid sample is essentially confined in the inner region $R_i$ as it is ejected, while the external liquid $L_e$ is essentially confined in the outer region $R_o$ as it gets aspirated, in operation.

In embodiments, the liquid distribution chamber 14, 24 may further comprises one or more (likely two) junction cavities 149, 149a, 249, 249a configured so as to ensure fluid communication between, on the one hand, a subset (at least) of the distribution channels 144, 244 and, on the other hand, a respective vacuum conduit aperture 148, 148a, 248, 248a. That is, if a single vacuum conduit aperture is involved, then a single junction cavity suffices to ensure fluid communication between all of the distribution channels 144, 244 and the unique vacuum conduit aperture. However, where several vacuum conduit apertures are involved, then a corresponding number of junction cavities may be designed to ensure fluid communication between, on the one hand, respective subsets of distribution channels 144, 244 and, on the other hand, respective vacuum conduit apertures. Yet, in more complex variants, other arrangements may be contemplated. For example, several junction cavities may be involved, which are in fluid communication with distinct subsets of the distribution channels 144, 244 and join below a unique vacuum conduit aperture.

As suggested above, the present MFPs 1, 1a, 2, 2a preferably involve two vacuum conduits 126, 126a, 226, 226a, leading to respective vacuum conduit apertures 148, 148a, 248, 248a in the liquid distribution chamber 14, 24. The vacuum conduit apertures are preferably arranged symmetrically with respect to the sample inlet aperture 147, 247 and substantially in a same plane (e.g., on a dome of the liquid distribution chamber 14, 24). Preferably then, two junction cavities 149, 149a, 249, 249a are provided, which are shaped as ring portions, or otherwise bent, so as to optimize the collection of external liquid via respective subsets of vertical channels 144, 244, in operation.

Figure 5B:
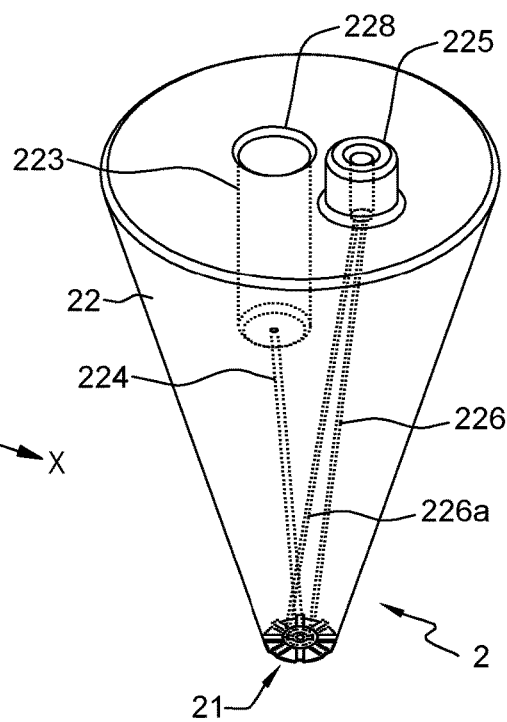
FIG. 5B illustrates a wireframe of the 3D view of FIG. 5A, in accordance with an embodiment of the present invention.
Figure 6A:
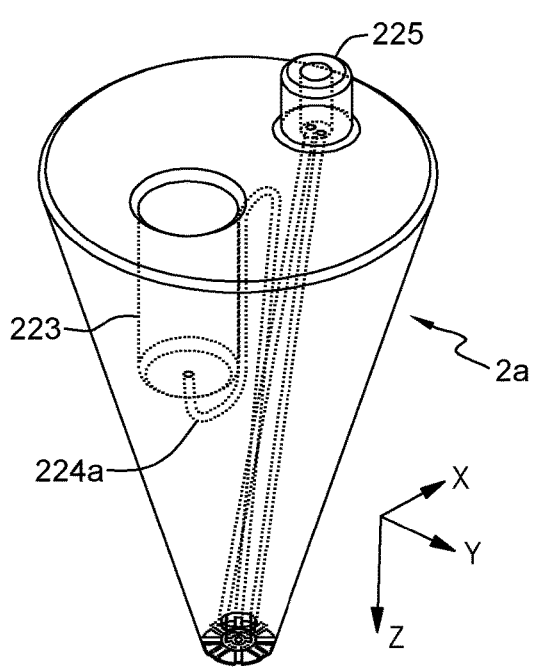
FIG. 6A illustrates a view of a variant of the tapered probe in FIG. 5A, where the sample feed conduit has a pair of hairpin turns, in accordance with an embodiment of the present invention.
Figure 6B:
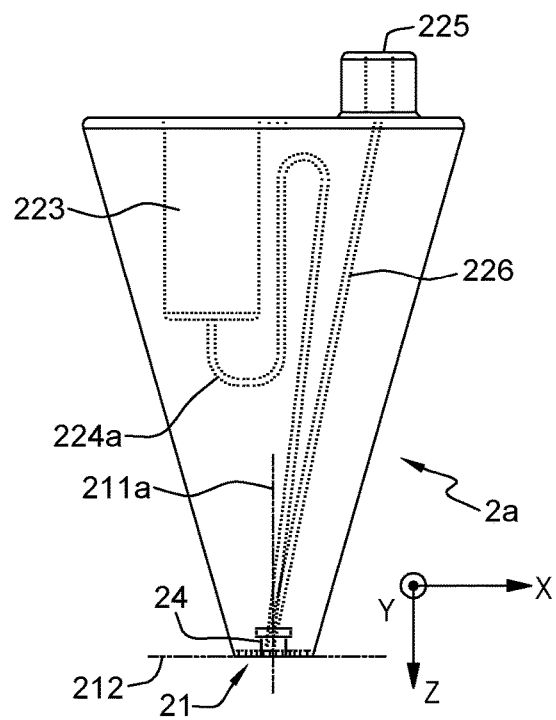
FIG. 6B illustrates another view of a variant of the tapered probe in FIG. 5A, where the sample feed conduit has a pair of hairpin turns, in accordance with an embodiment of the present invention.

FIG. 5A illustrates a 3D view of the tapered probe in FIG. 1A, in accordance with an embodiment of the present invention. FIG. 5B illustrates a wireframe of the 3D view of FIG. 5A, in accordance with an embodiment of the present invention. FIG. 6A illustrates a view of a variant of the tapered probe in FIG. 5A, where the sample feed conduit has a pair of hairpin turns, in accordance with an embodiment of the present invention. FIG. 6B illustrates another view of a variant of the tapered probe in FIG. 5A, where the sample feed conduit has a pair of hairpin turns, in accordance with an embodiment of the present invention.

Referring to FIGS. 1A-2B, and 5A-6B, preferred embodiments are now described, wherein the vacuum-driven microfluidic probes 1, 1a, 2, 2a have a body 12, 22 that further comprises a sample reservoir 123, 223 integrated therein. In that case, the sample feed conduit 124, 224 is arranged so as to fluidically connect the sample reservoir 123, 223 to the liquid distribution chamber 14, 24.

Such probes may further be supplied with a removable sample reservoir cap 127, so as to be able to close an inlet 128 of the sample reservoir. An onboard reagent reservoir 123, 223 is here provided directly within the body of the probe, which makes the device more autonomous. There is indeed no need to connect the MFP to an external fluid supply in that case. Note that the cap 127 preferably seals the same inlet 128 that is otherwise used to reload the reservoir 123.

The inlet 128, 228 of the sample reservoir 123, 223 may for instance be provided on the top face of the body 12, 22, opposite to the processing surface of the probe, as in FIGS. 5, 6, 8, 9 and 11. In variants such as depicted in FIGS. 1, 2, the reservoir inlet 128, 228 is provided on a lateral face of the body 12, 22 (i.e., parallel to the cavity axis 111a, 211a), which typically need be capped when operating the probe. The latter option eases the reloading of the reservoir. The reservoir is loaded while the probe is held horizontally and is afterward capped to prevent leakage due to the pressure resulting from the height (h) of the liquid column above the apex ($P = \rho\, g\, h$).

Yet, to cope with potential leakage issues, probes may be provided with a sample feed conduit 224a having an S-shape, as illustrated in FIGS. 6A-6B. I.e., the sample conduit 224a may exhibit one or more pairs of hairpin turns. This is especially useful for upright reservoir designs (whose reservoir inlet is provided on top), as in FIGS. 6A-6B. An S-channel configuration indeed prevents or, at least, mitigates the risk of leakage when re-loading, even for upright probes.

A reservoir cap may be used in each case (upright or side-reservoir configuration). Yet, a reservoir cap is not always needed. For example, in a side-reservoir design, a cap is not mandatory if the reservoir mainly extends vertically, below the inlet. Also, an upright configuration may not make it mandatory to use a reservoir cap, if the probe is always meant to remain vertical, be it when reloading the reservoir or when processing the surface.

As for instance illustrated in FIGS. 1A-2B, and 5A-6B, the present MFPs 1, 1a, 2, 2a preferably have a vacuum port 125, 225 provided on a face of the body 12, 22 (preferably the top face, for ergonomic reasons). The vacuum conduits 126, 126a, 226, 226a fluidically connect the vacuum port 125, 225 to the liquid distribution chamber 14, 24. As said earlier, the present MFP preferably relies on vacuum sources only and do not require positive pressure sources. Still, vacuum ports or other tubing ports are needed to connect the probe to a vacuum source. The concept of vacuum port is known per se; it allows a vacuum source 40, 50 to be connected to the MFP. Here the vacuum port is provided directly on the body of the MFP.

Figure 11A:
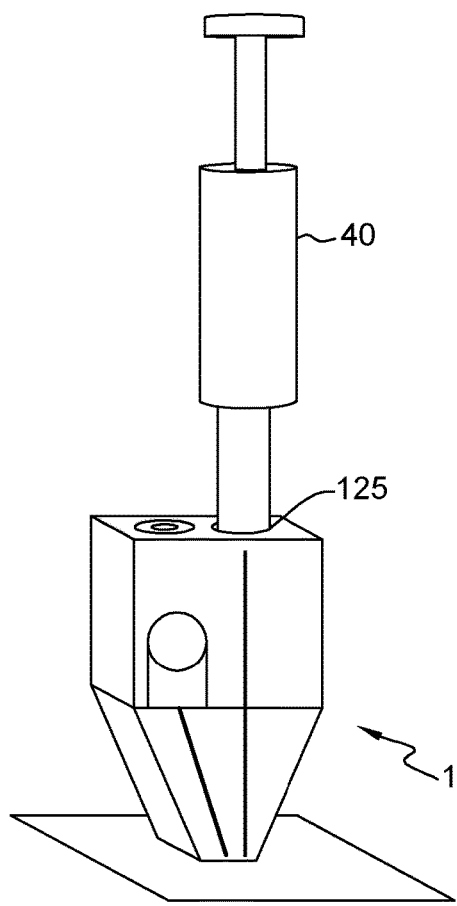
FIG. 11A illustrates a 3D view for a connection of a tapered a microfluidic probe to a vacuum source, in accordance with an embodiment of the present invention.

Preferably, the vacuum port is furthermore specifically designed to allow a vacuum source to be removable and connected to the body, e.g., repeatedly and as needed for daily use. For instance, in the present case, the vacuum port 125, 225 may be designed so as to allow a syringe or a pipette to be directly connected thereto, as illustrated in FIG. 11A, and later removed after use. The vacuum port may for instance be designed to allow snap-fitting or press-fitting insertion of the open end (nozzle) of the pipette or syringe.

Figure 11B:
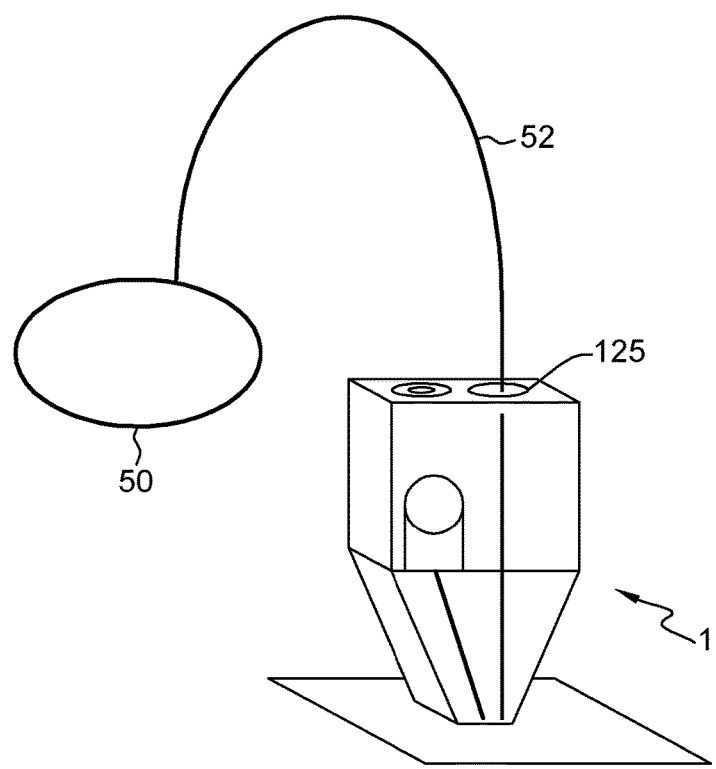
FIG. 11B illustrates another 3D view for a connection of a tapered a microfluidic probe to a vacuum source, in accordance with an embodiment of the present invention.

FIG. 11A illustrates a 3D view for a connection of a tapered a microfluidic probe to a vacuum source, in accordance with an embodiment of the present invention. FIG. 11B illustrates another 3D view for a connection of a tapered a microfluidic probe to a vacuum source, in accordance with an embodiment of the present invention.

In that respect, referring to FIG. 11A, the present probes 1 may be supplied with a vacuum pipette 40 or syringe, designed so as to be connectable to said vacuum port 15. Such a pipette 40 provides an easy vacuum source 40 for operating the probe 1. Some vacuum syringes are for instance commercially available, which allow a user to lock a plunger of the syringe in a position that create and maintain a negative pressure. In less autonomous variants, other vacuum sources 50 could be relied upon, as illustrated in FIG. 11B, in which case the MFP may be equipped with classical tubing port and connected via tubing 52 to the external source 50. In such cases, the ports need not specifically be designed to allow repeated connection to/disconnection from the vacuum source.

Figure 4:
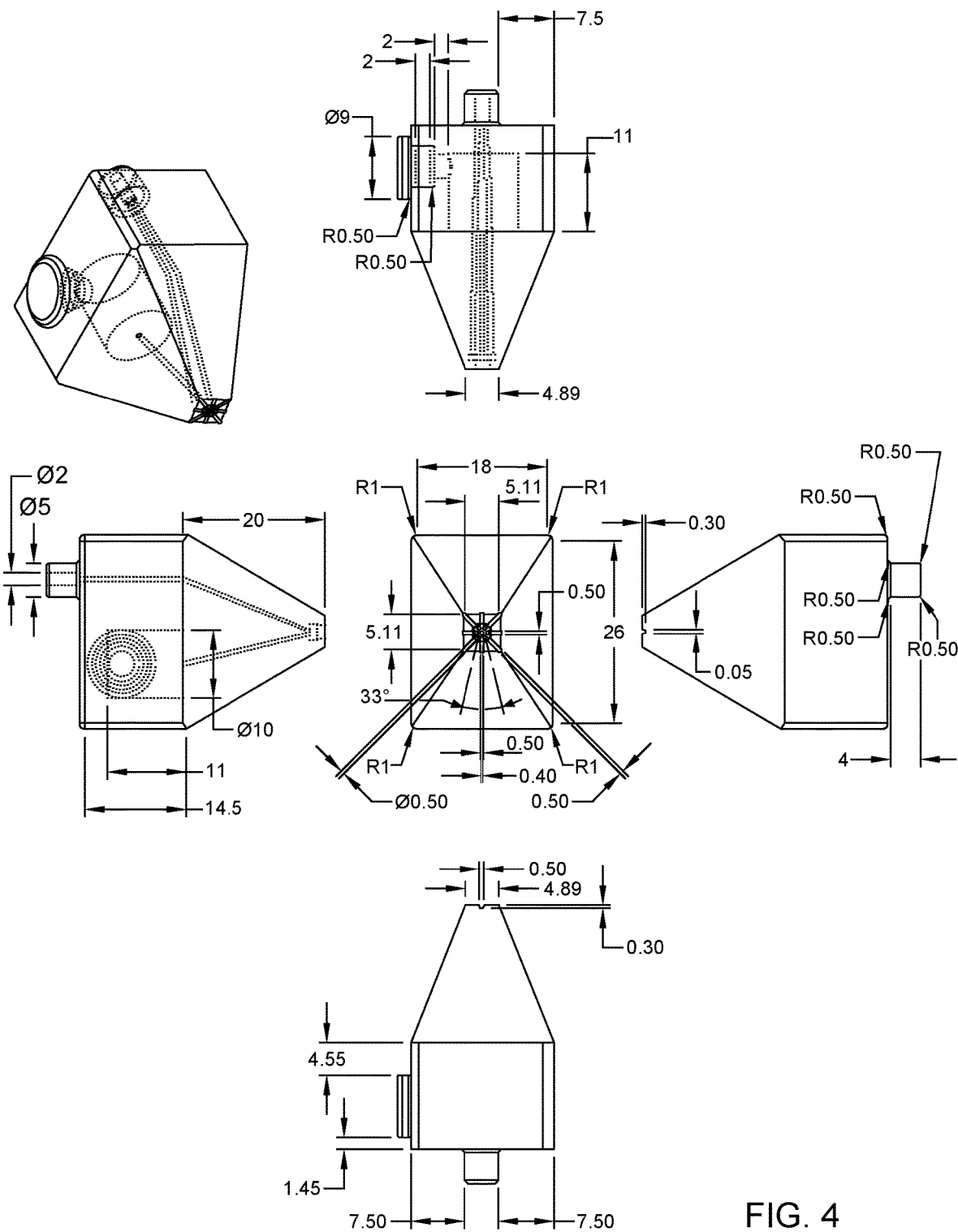
FIG. 4 illustrates example dimensions (in millimeters, or mm) of basic details of the tapered probe in FIG. 1A, in accordance with an embodiment of the present invention.

FIG. 4 illustrates example dimensions (in millimeters, or mm) of basic details of the tapered probe in FIG. 1A, in accordance with an embodiment of the present invention.

Figure 8:
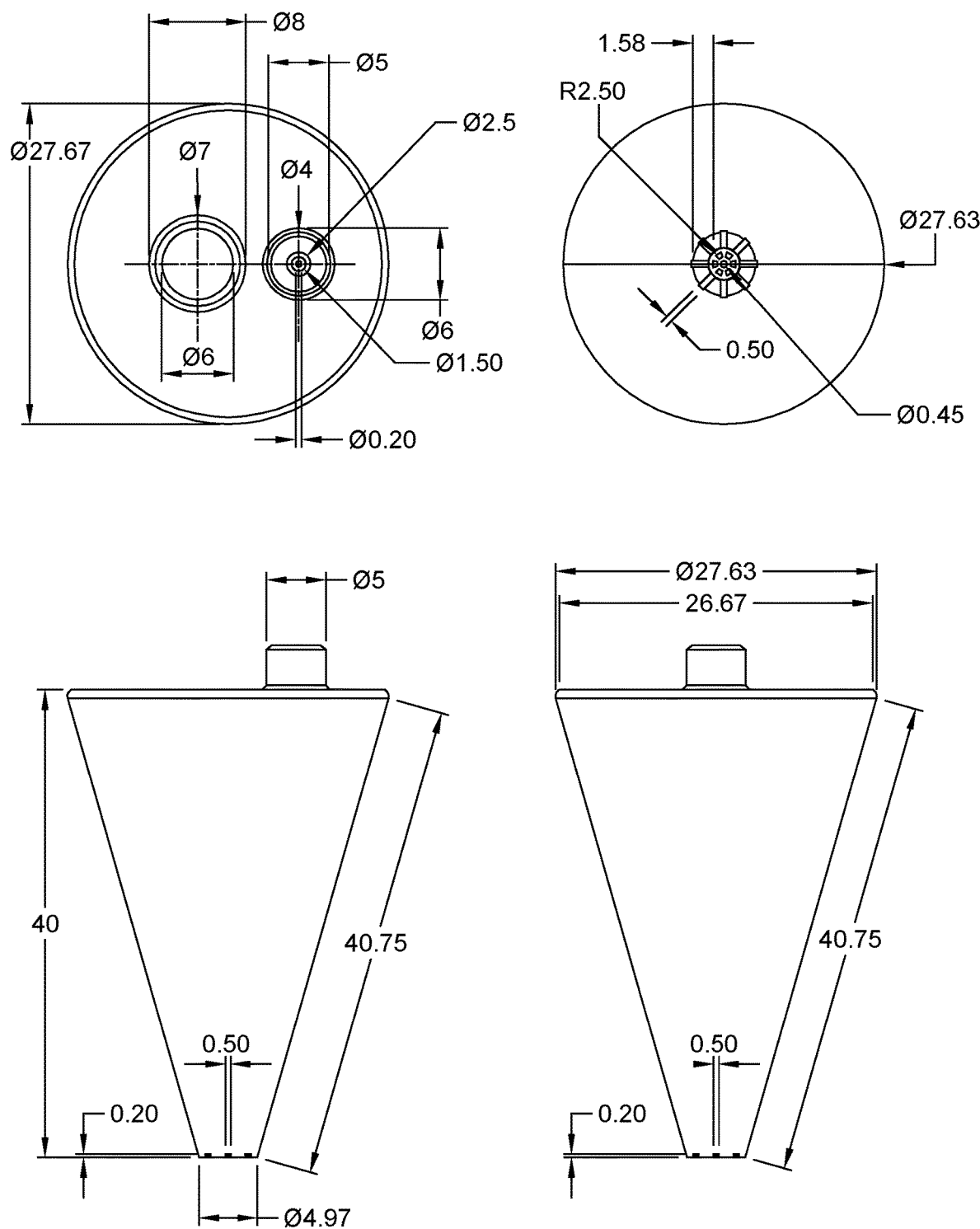
FIG. 8 illustrates example dimensions (in millimeters, or mm) of basic details of the tapered probe in FIG. 5A, in accordance with an embodiment of the present invention.

FIG. 8 illustrates example dimensions (in millimeters, or mm) of basic details of the tapered probe in FIG. 5A, in accordance with an embodiment of the present invention.

Figure 9:
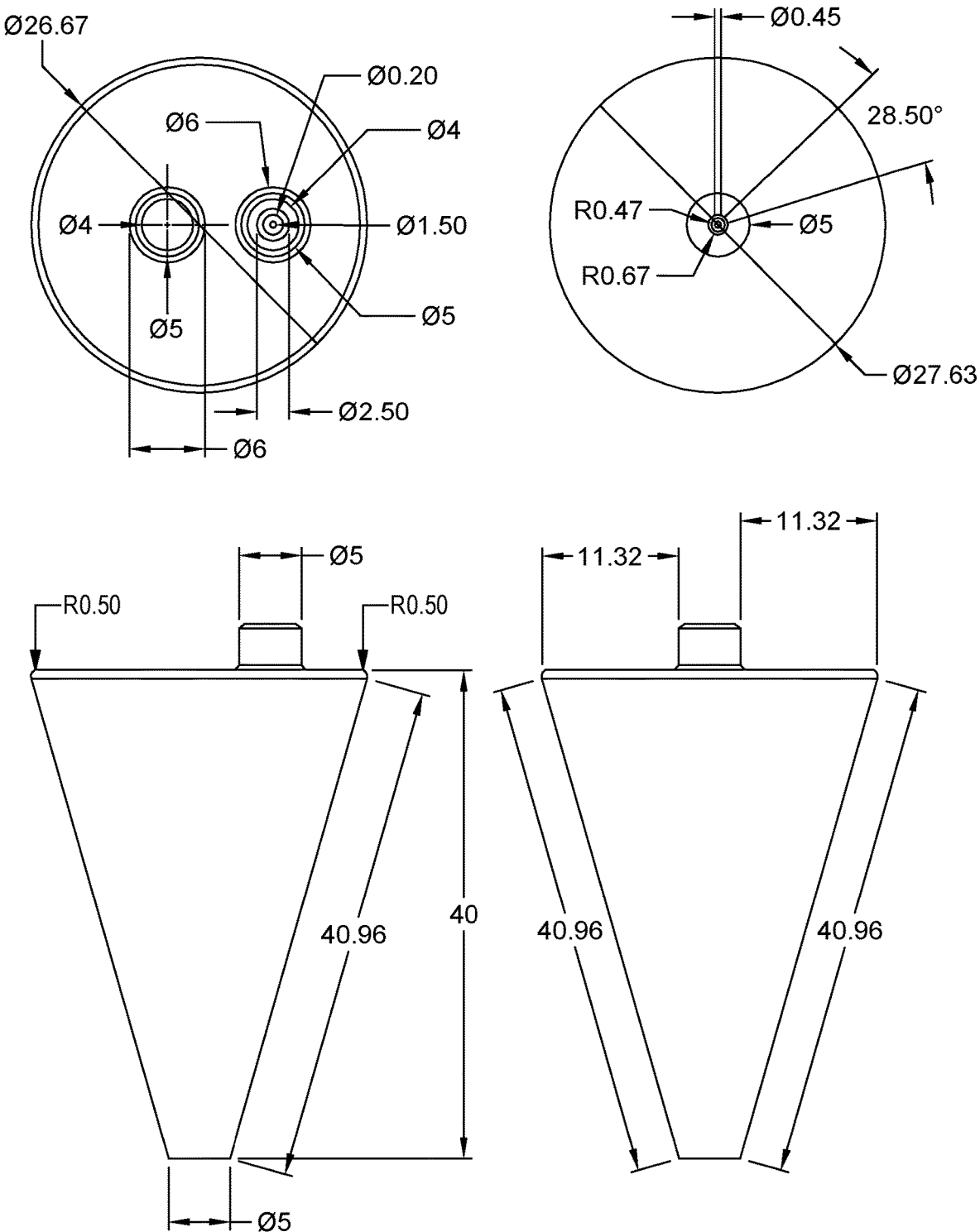
FIG. 9 illustrates example dimension (in millimeters, or mm) of basic details of the tapered probe in FIG. 5A designed for non-contact operation, in accordance with an embodiment of the present invention.

FIG. 9 illustrates example dimension (in millimeters, or mm) of basic details of the tapered probe in FIG. 5A designed for non-contact operation, in accordance with an embodiment of the present invention.

Preferred dimensions of the MFPs are for instance given in the general drawings of FIGS. 4, 8, and 9. FIG. 4 pertains to a tapered probe, with a side-loaded reservoir. The vacuum port on top may be used to connect a pipette or, in variants, a vacuum source via a standard tubing. FIGS. 8 and 9 relate to conic designs, which assume an upright configuration of the reservoir, just like FIGS. 5-6. In FIG. 8, the MFP is designed for touchdown operation with a 0.2 mm predefined gap. The reservoir volume is of 600 μl. The design of FIG. 9 is very close to that of FIG. 8, except that the MFP of FIG. 9 can be mounted on a holder platform and operated at a working distance set between 0 to 500 micrometers away from the substrate.

As seen in FIGS. 4, 8 and 9, the diameter of the sample outlet aperture may typically be in the sub-millimeter range (e.g., 0.5 mm), while a characteristic dimension of the footprint of the processing surface may be in the sub-centimeter range. The whole height of the MFP may not exceed a few centimeters. More generally though, the average diameter of the sample outlet aperture 117, 217 may be between 50 μm and 1 mm. The characteristic dimension of the footprint of the processing surface is typically between 5 and 20 (e.g., approximately 10) times the average diameter of the sample outlet aperture. The dimensions of the processing surface and the apertures in the cavity impacts the number of vacuum conduits needed in practice.

In that respect, the apex 11, 21 of the present MFPs 1, 1a, 2, 2a is preferably structured so as to form at least 4 aspiration apertures 116, 216. More preferably, at least 6 apertures are provided, as assumed in FIGS. 3A and 7A. Because the chamber 14, 24 may require a symmetric arrangement of aspiration conduits, an even number of apertures is typically used, which are symmetrically distributed around the ejection aperture. While this number may, in principle, be as large as possible, the fabrication technique and the chosen scale will typically limit it, e.g., to less than or equal to, e.g., 12 or 24. Also, the larger the number of apertures, the smaller their diameter and the higher the risk of clogging (at small scales). In addition, another trade-off is needed between, on the one hand, the number of such apertures 116, 216 and, on the other hand, adapted aperture dimensions, so as to generate adequate pressure in the cavity and allow a vacuum-driven MFP. Having at least 4 apertures (and at most 12, or 24) already allows to suitably distribute the aspirated liquid around the ejected processing liquid, while still being relatively simple to manufacture in practice. The chamber 14, 24 is typically designed so as to have a corresponding number of distribution channels 144, 244. Yet, the number of outer slots 114, 214 may typically be larger. This is to allow a uniformly distributed aspiration, resulting in a stable symmetrical confinement.

In embodiments, the diameter of the outlet aperture (117, 217) ranges from 10-20 microns to a few millimeters. The exact size depends on the application, the footprint and flow rates desired and the fabrication method chosen. For instance, outlet apertures with diameters of 400-500 μm may easily be fabricated using a 3D printing technique. In that case, six aspiration apertures (116, 216) may for instance be radially distributed along the periphery of a circle offset by a sufficient distance from the outlet aperture (this distance ranging from 100 μm to 400 μm, depending, again, on the desired application, the flow rates and the exact fabrication method used). The equal spacing between the six aspiration apertures is defined by the perimeter of the circle they are located on and may typically be between 200-300 μm.

For completeness, eight radial openings 114, 214 are preferably used, which may for instance be 500 μm wide. However, the width of these openings may vary, depending on the desired application and flow rate ratios. Such openings may also be equally spaced and distributed radially across the apex. The legs 112, 212 may simply fill the gap between the radial openings 114, 214.

Figure 10:
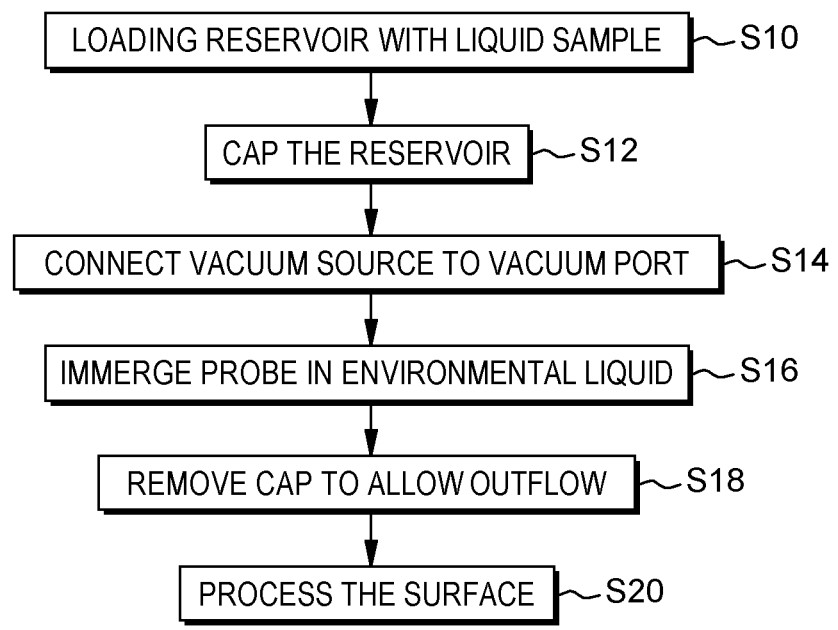
FIG. 10 is a flowchart illustrating high-level steps of a preferred method of operating a microfluidic probe, in accordance with an embodiment of the present invention.

FIG. 10 is a flowchart illustrating high-level steps of a preferred method of operating a microfluidic probe, in accordance with an embodiment of the present invention. FIG. 11A illustrates a 3D view for a connection of a tapered a microfluidic probe to a vacuum source, in accordance with an embodiment of the present invention. FIG. 11B illustrates another 3D view for a connection of a tapered a microfluidic probe to a vacuum source, in accordance with an embodiment of the present invention. FIG. 12A illustrates a model of pressures and hydraulic resistances, as relevant to the optimization of the design of a probe connected to a vacuum pipette (as in FIG. 11A), in accordance with an embodiment of the present invention. FIG. 12B illustrates another model of pressures and hydraulic resistances, as relevant to the optimization of the design of a probe connected to a vacuum pipette (as in FIG. 11A), in accordance with an embodiment of the present invention. FIG. 13A illustrates a model of pressures and resistances relevant to the optimization of the design of a probe connected to an external vacuum source (as in FIG. 11B), in accordance with an embodiment of the present invention. FIG. 13B illustrates another model of pressures and resistances relevant to the optimization of the design of a probe connected to an external vacuum source (as in FIG. 11B), in accordance with an embodiment of the present invention.

Referring now to FIGS. 10-13B, another aspect of the invention is described, which concerns methods of operating a vacuum-driven MFP 1, 1a, 2, 2a such as described above. Aspects of such methods have already been implicitly addressed earlier. Essentially, such methods rely on connecting S14 a vacuum source 40, 50 to the MFP 1, 1a, 2, 2a and immersing S16 the apex 11, 21 of the probe in an external liquid $L_e$ that covers a surface S to be processed. Connecting the vacuum source causes to aspirate external liquid $L_e$ through the aspiration apertures 116, 216. As a result, a pressure is generated in the cavity 111, 211 (as per the design of the apex), which causes to aspirate liquid sample from the sample outlet aperture 117, 217 and eject S20 the liquid sample toward the surface S, which can then be processed.

As evoked earlier in reference to FIG. 11A, a vacuum pipette 40 is preferably connected S14 to the vacuum port 125, 225 of the MFP. In variants, an external vacuum source 50 may be used. For example, a hydrostatically induced vacuum source may be relied on, to siphon liquid, e.g., using a manometer-like device. Yet, any suited, external vacuum source can be contemplated.

In preferred embodiments, the MFP is provided with a reservoir 123, 223 integrated in the body of the probe and the latter is supplied with a removable reservoir cap 127, adapted to close the inlet 128, 228 of the reservoir 123, 223 on the body. In such cases, the MFP is preferably handled as follows: First, the reservoir 123, 223 is loaded (FIG. 10, step S10) with a liquid sample (a reagent, or any analyte to be used to process the surface); The reservoir 123, 223 is then capped S12 by closing the inlet 128, 228 with the cap 127 and, this, prior to connecting the vacuum source 40, 50 to the probe; and after having connected S14 the vacuum source 40, 50 and immersed S16 the apex 11, 21 of the probe in the external liquid $L_e$, the reservoir cap 127 is removed S18 to allow the liquid sample to be drawn S20 from the reservoir 123, 223, upon aspiration of the external liquid $L_e$ (the order of steps S14 and S16 is not critical in practice). This way, no processing liquid will be leaked before removing the cap, notwithstanding the vacuum pressure connected.

This operation might be illustrated with a more concrete example, assuming that the MFP has a side-reservoir configuration, as in FIGS. 1-2. Here, the reservoir is loaded S10 while the instrument is held horizontally. It is then capped S12 with a plug 127 to prevent leakage due to the pressure head. Loading of reservoir from the side followed by insertion of the cap will ensure minimal accidental leakage from the probe onto the surface. Next, the vacuum source (e.g., a mere vacuum syringe) is connected S14 to the vacuum port 125. The reservoir is then uncapped S16, to start the flow. The instrument is brought in the vicinity of the surface S of interest, so as to immerse the apex of the probe, S18. The reagent will thus flow through the inlet channel past the surface and will be collected through the vacuum channel, together with external liquid. This allows the surface S to be processed S20.

The operation can be stopped by removing the instrument from the surface, capping the reservoir (especially if some unused reagent remains in the reservoir) and stopping the vacuum.

The above embodiments have been succinctly described in reference to the accompanying drawings and may accommodate a number of variants.

For example, a MFP as described herein may include a number of reservoirs (forming an array of potential reagents), with stop valves to allow sequential operation of the probe. This is particularly advantageous for uses in immunostaining or testing of various blood samples or antibodies against a sample existing on a surface.

More generally, some of the concepts disclosed herein opens up a new avenue on "hand-held" MFP devices that can generally be used in molecular and cell biology laboratories, for example. Such devices depart from traditional MFP devices that rely on precision positioning systems. New application areas can be contemplated. For example, some of the MFP devices disclosed herein may be used to extract DNA and proteins from electrophoresis gels, used as a "sampling" tool in plant biology or field biology, where extensive lab infrastructure is not available. As another example, the present MFP may be used as "point of use" devices.

Thermoplastic vacuum probe devices can be mass-produced at low-cost and transformed into a common lab tool, similar to pipettes for interfacing and rapid localized testing with various culture and tissue well plates.

Here, additional details are given as to possible hydrodynamic designs of the vacuum-driven probe, in reference to FIGS. 12 and 13. Two options are discussed, which show how the design of the MFP determines the hydraulic resistances (noted $R_i$) of the various flow paths involved, which in turn determine the flow rates $Q_j$ of the liquids in each flow path. In each case, a suitable design of the probes can be achieved, by adequately dimensioning the hydrodynamic conduit circuit and, this, to ensure a desired reagent consumption flow rate, for a given vacuum strength or other fixed parameters.

A first option (FIGS. 12A, 12B) is to adapt the dimensions (e.g., channel dimensions) of a probe meant to be connected to a vacuum pipette, as in FIG. 11A. Adapting dimensions of the channels impact their hydraulic resistances and, in turn, the flow rates. The various flow rates shown in FIG. 12, i.e., $Q_1, Q_2, Q_3$ respectively correspond to: $Q_1$: The consumption rate of liquid from the reservoir, i.e., liquid flowing along the "second flow path" in sect. 1); $Q_2$: The flow rate of liquid aspirated in the probe (i.e., liquid aspirated along the "first flow path" in sect. 1); and $Q_3$: The flow rate of external liquid aspirated via the cavity (this liquid is not within the body of the MFP yet). Such flow rates are given by:

$$Q_1 = \frac{P_{atm} - P_s}{R_1},$$

such that $Q_1$ is essentially equal to $$Q_1 \approx \frac{-P_s}{R_1}; Q_2 = \frac{P_s - P_V}{R_2}; \text{ and}$$

$$Q_3 = \frac{P_{atm} - P_s}{R_3}, \text{ that is, } Q_3 \approx \frac{-P_s}{R_3}$$

The various pressures and hydraulic resistances correspond to locations and flow paths as shown in FIG. 12A. $P_V$ denotes the "vacuum" pressure the MFP is subject to and $P_{atm}$ is the ambient pressure. $P_S$ pertains to the pressure in the cavity. In addition, $R_1$ is the resistance of the sample feed conduit 124, $R_2$ is the resistance of the vacuum conduit(s) 126, 126a, while $R_3$ is the resistance of the cavity 111.

Now, the conservation of mass implies $Q_2=Q_1+Q_3$. More generally, combining all hydrodynamic equations, i.e., $P_S=-Q_1R_1$, $P_S=P_V+Q_2R_2$, $P_S=-Q_3R_3$, and $Q_2=Q_1+Q_3$, one can eliminate $P_S$ and obtain:

$$Q_2 = \frac{Q_1 - \frac{P_V}{R_3}}{1 + \frac{R_2}{R_3}},$$

and $Q_3=Q_2-Q_1$, which are the needed quantities. That is, from a given input parameter (i.e., $P_V$, as imposed by the vacuum pipette), and given a target flow rate $Q_1$ one wishes to achieve, the design of the probe (and in particular the hydrodynamic conduit network and the cavity) can be optimized to yield optimal resistances $R_2$ and $R_3$, i.e., corresponding to the resistances that the vacuum conduit(s) and the cavity must oppose, in order for $Q_2$ to allow the desired flow rate $Q_1$. Note that the viscosity of the external liquid itself may also be optimized, if needed, so as to modify $R_3$.

A second option (FIG. 13A, 13B) is to connect the MFP to an external source 50, which imposes a further resistance $R_t$, due to the extra tube 52 needed. A similar calculation as performed above yield, in that case:

$$Q_2 = \frac{Q_1 - \frac{P_V}{R_3}}{1 + \frac{R_2 + \square_t}{R_3}},$$

while the conservation of mass $Q_3=Q_2-Q_1$ still holds. Again, from given input parameters (here $P_V$ and $R_t$), and given a target flow rate $Q_1$ one wishes to achieve, the design of the probe can be optimized to yield optimal resistances $R_2$ and $R_3$. If necessary, $R_t$ can be adapted too.

More generally, one understands that the design of the MFP can be optimized so as to obtain a desired flow rate of ejected (processing) liquid.

Interestingly, one can identify three ways to alter the flow rates in the MFP operation, by optionally using screw valves, as evoked in the previous section. Namely: $Q_1$: one may alter the consumption flow rate of analyte stored in the reservoir, thanks to a screw valve adequately located on the feed conduit 124, as explained in sect. 1; $Q_3$: one may similarly alter the flow of the immersion liquid aspirated through the vacuum conduits, thanks to a screw valve adequately located on the vacuum conduit(s) 126, 126a; and $Q_2=Q_1+Q_3$: one may further alter the total flow rate in the vacuum conduits, again thanks to a screw valve.

That is, there are two screw valves, one located on the way of the reservoir feed conduit (124) and one located on the way of the vacuum conduits (126 and 126a). The first screw valve (124) controls the flow of analyte (by varying the flow resistance $R_1$) and the second valve alters the vacuum level in the cavity ($P_S$), by varying the flow resistance in the conduits 126, 126a ($R_2$), and consequently can control all flow rates in the system ($Q_1$, $Q_2$, $Q_3$).

These flow rates are interrelated, as noted above, while the internal hydraulic resistances are, each, a function of the conduit geometry, their length and the fluid viscosity. And using screw valves can alter both the flow rates and the resistances. As a result, the flow rates can be varied as follows (assuming a connection to an external vacuum source, as in FIG. 13): $Q_2$=function ($P_V$, $R_2$, $R_3$, $R_t$). That is, the total flow rate can be adjusted via the vacuum level and geometries of the vacuum conduits, the touchdown legs and surface-probe gap as well as the geometry and length of the vacuum tubing. $Q_1$=function ($P_V$, $R_2$, $R_t$, $R_1$, $R_3$): $Q_1$ additionally depends on $R_1$; and $Q_3$=function ($P_V$, $R_2$, $R_t$, $R_1$, $R_3$), owing to $Q_1R_1=Q_3R_3$.

According to the relation $Q_1R_1=Q_3R_3$, $Q_1$ and $Q_3$ are have an inverse relationship, meaning that an increase in one will result in a decrease in the other. Yet, a screw valve may reduce the effective diameter of a conduit and result in higher resistance and lower flow rate. In a fully close position, there will be no flow in the channel the valve is acting on.

Numerical simulations and experiments conducted by the Inventors have shown that a MFP can be optimized according to the above principles, to yield an apex adapted to generate, upon aspirating the external liquid through the aspiration apertures of the cavity, the necessary pressure in the cavity to cause to aspirate and eject liquid sample at a desired flow rate from the probe.

In particular, numerical models have shown that a purely vacuum-driven MFP can achieve processing fluid localization with little functional difference with respect to a probe actuated thanks to both pressure and vacuum. Notably, the velocity field obtained is nearly identical in both scenarios.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, various materials could be used for the probes, such as polymers or PDMS.

What is claimed is:

1. An apparatus for a vacuum-driven microfluidic probe, the apparatus comprising:
    a body with an apex;
    a processing surface, at an end of the body;
    a partially open cavity formed as a recess on the processing surface;
    a set of apertures in the cavity, wherein the set of apertures include a sample outlet aperture intersected by a vertical axis of the cavity; and
    aspiration apertures radially distributed around said vertical axis, wherein the apex is further configured to generate a pressure in the cavity upon aspirating an external liquid through the aspiration apertures that causes to aspirate a liquid sample from the sample outlet aperture, so as to eject the aspirated liquid sample from the probe.

2. The vacuum-driven microfluidic probe according to claim 1, further comprising:
    a liquid distribution chamber that includes a sample inlet aperture, opposite the sample outlet aperture, so as to be intersected by the vertical axis of the cavity, and at least one vacuum conduit aperture, off-centered with respect to said axis, wherein the apex is further configured to include a first flow path going from the aspiration apertures to the at least one vacuum conduit aperture; and
    a second flow path going from the sample inlet aperture to the sample outlet aperture; and the apex is configured to generate a pressure in the cavity that causes to aspirate liquid sample along the second flow path, upon aspirating external liquid along the first flow path.

3. The vacuum-driven microfluidic probe according to claim 2, further comprising:
    a conduit network, wherein the conduit network includes at least one vacuum conduit leading to said at least one vacuum conduit aperture, respectively, whereby the first flow path goes from the aspiration apertures to the at least one vacuum conduit, via the at least one vacuum conduit aperture; and
    a sample feed conduit, leading to the sample inlet aperture, whereby the second flow path goes from the sample feed conduit to the sample outlet aperture, via the sample inlet aperture.

4. The vacuum-driven microfluidic probe according to claim 1, wherein the apex includes legs that are radially distributed with respect to said vertical axis, so as to form aspiration slots defined, each, between contiguous ones of the legs, which slots are in fluid communication with said aspiration apertures.

5. The vacuum-driven microfluidic probe according to claim 4, wherein the legs extend in a plane perpendicular to said vertical axis and opposite to the sample outlet aperture, so as to partly close the cavity, and wherein a rim of the cavity is defined by innermost edges of the legs.

6. The vacuum-driven microfluidic probe according to claim 5, wherein the apex is further configured so as to allow liquid aspirated from the sample inlet aperture to be confined, in the cavity, within external liquid aspirated through the aspiration slots, in operation.

7. The vacuum-driven microfluidic probe according to claim 2, further comprising:
   a liquid distribution chamber that includes a sample inlet aperture, opposite the sample outlet aperture, so as to be intersected by the vertical axis of the cavity; and
   at least one vacuum conduit aperture, off-centered with respect to said axis, wherein the chamber further comprises distribution channels that extend parallel to the vertical axis of the cavity, wherein the distribution channels are: radially distributed with respect to said axis; and in fluid communication with said aspiration apertures, such that the first flow path goes from the aspiration apertures to the at least one vacuum conduit aperture via the distribution channels.

8. The vacuum-driven microfluidic probe according to claim 7, wherein the liquid distribution chamber includes at least one junction cavity configured so as to ensure fluid communication between, on the one hand, at least a subset of the distribution channels and, on the other hand, a respective one of the at least one vacuum conduit aperture.

9. The vacuum-driven microfluidic probe according to claim 3, wherein the body includes a sample reservoir, integrated in the body, the sample feed conduit arranged so as to fluidically connect the sample reservoir to the liquid distribution chamber.

10. The vacuum-driven microfluidic probe according to claim 9, wherein the body includes an inlet of the sample reservoir, said inlet provided on one of: a top face of the body, opposite to said processing surface of the probe; and a lateral face of the body, the lateral face parallel to the vertical axis of the cavity.

11. The vacuum-driven microfluidic probe according to claim 3, wherein the sample feed conduit is configured, in the body, so as to exhibit one or more pairs of hairpin turns.

12. The vacuum-driven microfluidic probe according to claim 3, wherein the body includes a vacuum port, configured so as allow a vacuum source to be removable and connected to the body, the at least one vacuum conduit fluidically connecting the vacuum port to the liquid distribution chamber.

13. The vacuum-driven microfluidic probe according to claim 12, wherein the probe includes a vacuum pipette connectable to said vacuum port so as to provide a vacuum source for operating the probe.

14. The vacuum-driven microfluidic probe according to claim 1, wherein an average diameter of the sample outlet aperture is between 50 µm and 1 mm.

15. The vacuum-driven microfluidic probe according to claim 14, wherein the apex is structured so as to define between four and twelve of said aspiration apertures.

16. The vacuum-driven microfluidic probe according to claim 3, wherein the body includes one or more screw side valves, configured to modify a flow rate of liquid flow in one or each of: the sample feed conduit and the vacuum conduit.

17. The vacuum-driven microfluidic probe according to claim 3, wherein the body includes two vacuum conduits leading to respective vacuum conduit apertures in the liquid distribution chamber.

* * * * *